United States Patent
Wang et al.

(10) Patent No.: US 12,536,346 B2
(45) Date of Patent: Jan. 27, 2026

(54) DECISION-MAKING METHOD AND SYSTEM FOR RESIDENTIAL OUTDOOR ENVIRONMENT BASED ON LANDSCAPE APPROACH MOTIVATION

(71) Applicant: SOUTHEAST UNIVERSITY, Nanjing (CN)

(72) Inventors: Liya Wang, Nanjing (CN); Zhe Li, Nanjing (CN); Bingyu Hou, Nanjing (CN); Hao Cao, Nanjing (CN); Qiaochu Wang, Nanjing (CN); Haini Chen, Nanjing (CN); Mengyao Yu, Nanjing (CN); Yi Shi, Nanjing (CN); Yuheng Liu, Nanjing (CN); Chaoming Li, Nanjing (CN); Haonan Ding, Nanjing (CN); Yulong Zhao, Nanjing (CN); Xinying Wu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 19/066,172

(22) Filed: Feb. 28, 2025

(65) Prior Publication Data
US 2025/0378213 A1 Dec. 11, 2025

Related U.S. Application Data

(63) Continuation of application No. PCT/CN2024/131444, filed on Nov. 12, 2024.

(30) Foreign Application Priority Data

Jun. 7, 2024 (CN) .......................... 202410735652.3

(51) Int. Cl.
*G06F 30/13* (2020.01)
*G06Q 50/26* (2012.01)

(52) U.S. Cl.
CPC ............. *G06F 30/13* (2020.01); *G06Q 50/26* (2013.01)

(58) Field of Classification Search
CPC .......... G06F 30/00; G06F 30/13; G06Q 50/26
(Continued)

(56) References Cited

U.S. PATENT DOCUMENTS 10,572,118 B2 * 2/2020 Priest ...................... G06F 30/00

FOREIGN PATENT DOCUMENTS

| CN | 105868533 A | 8/2016 |
|---|---|---|
| CN | 111325647 A | 6/2020 |

(Continued)

OTHER PUBLICATIONS

Xueyuan Li, et al., Information system of mining geological environment dynamic monitoring and evaluation based on RS and GIS, 2018, pp. 1-170, China University of Mining & Technology, Beijing.

(Continued)

*Primary Examiner* — Cedric Johnson
(74) *Attorney, Agent, or Firm* — Bayramoglu Law Offices LLC

(57) ABSTRACT

A decision-making method and system for a residential outdoor environment based on landscape approach motivation are provided. The method includes: collecting engineering drawing data and environmental element material test data of the residential outdoor environment, and translating test results of residential outdoor environmental elements into landscape approach motivation structural information; delineating landscape nodes in the residential outdoor environment, building an initial decision-making matrix of approach motivation change states of the environmental elements corresponding to the landscape nodes, and decomposing the landscape approach motivation change states into (Continued)

a. Development trend of the landscape approach motivation evolution state of the residential outdoor environment b. Development trend of the landscape approach motivation evolution state of functional level elements in the residential outdoor environment an evolution state and similarity state, building a decision-making matrix of a landscape approach motivation distribution adjacency network, and calculating a driving degree of the distribution adjacency network in the residential outdoor environment; distinguishing level patterns of the landscape approach motivation change states, generating a decision-making network of the residential outdoor environment, and clarifying priorities of renewal and management for the residential outdoor environment.

9 Claims, 13 Drawing Sheets

(58) Field of Classification Search
 USPC .............................................................. 703/1
 See application file for complete search history.

(56) References Cited

FOREIGN PATENT DOCUMENTS

| CN | 113051642 | A | * | 6/2021 | ............. | G06F 30/23 |
|----|-----------|---|---|--------|---|------------|
| CN | 113177239 | A | * | 7/2021 | ............. | G06T 17/00 |
| CN | 114707312 | A |   | 7/2022 |   |            |
| CN | 114969928 | A |   | 8/2022 |   |            |
| CN | 116151442 | A |   | 5/2023 |   |            |
| CN | 116894750 | A | * | 10/2023 | ............. | G06Q 50/26 |
| CN | 118036132 | A | * | 5/2024 | ............. | G06F 30/20 |
| CN | 118552376 | A |   | 8/2024 |   |            |

OTHER PUBLICATIONS

Xu Dong, et al., Cognitive Evaluation of Landscape Elements Based on Point-Touch Heat Analysis: A Case Study of Beijing Forestry University, Landscape Architecture, 2022, pp. 106-112, vol. 29 No. 12.

Fu Hongpeng, et al., Emotional Characteristics and Influencing Factors of Urban Park Users: A Case Study of South China Botanical Garden and Yuexiu Park, Acta Scientiarum Naturalium Universitatis Pekinensis, 2021, pp. 1108-1120, vol. 57 No. 6.

Fu Xing-Yuan, et al., Comparative Study on Differences between Landscape Preference and Landscape Cognition of Urban Park Users, Journal of Southwest China Normal University (Natural Science Edition), 2020, pp. 127-136, vol. 45 No. 3.

\* cited by examiner a. Summer b. Autumn

DECISION-MAKING METHOD AND SYSTEM FOR RESIDENTIAL OUTDOOR ENVIRONMENT BASED ON LANDSCAPE APPROACH MOTIVATION

CROSS REFERENCE TO THE RELATED APPLICATIONS

This application is a continuation application of International Application No. PCT/CN2024/131444, filed on Nov. 12, 2024, which is based upon and claims priority to Chinese Patent Application No. 202410735652.3, filed on Jun. 7, 2024, the entire contents of which are incorporated herein by reference.

TECHNICAL FIELD

The present invention relates to the technical field of quality and efficiency improvement of built environments, specifically to a decision-making method and system for a residential outdoor environment based on landscape approach motivation.

BACKGROUND

Landscape approach motivation is one of the main factors affecting the use of residential outdoor environments, and plays a decisive role in residents' behaviors and attitudes. Residential landscape environments lacking psychological tendencies and behavioral drivers have relatively low usage and satisfaction. The specific manifestation of landscape approach motivation is a cognitive response of "approach-avoidance", which reflects intuitive decision-making on the attractiveness and repulsion of environmental elements. Related studies have shown that the environmental governance decision-making process guided by landscape approach motivation emphasizes data-driven and integrated evaluation to adapt to complex and changing environmental conditions, thereby maximizing the satisfaction of residents' expectations and needs. Objective and rational brain cognitive data analysis and decision-making can help technology developers, environmental designers, residential area managers, and others capture landscape environmental features accurately and in real time, thereby providing basic data supply for the renewal and governance of refined residential outdoor environments.

At present, the analysis methods that combine landscape elements and cognitive evaluation include: Cognitive Evaluation on Landscape Elements Based on Point-Touch Heat Analysis (2022) on landscape preference decision-making methods based on real-life photo shooting, element point touch rate calculation, and thermal aggregation statistics; Research on Emotional Characteristics and Influencing Factors of Urban Park Users (2021) on landscape emotion cognitive path methods based on park emotion questionnaire survey, structural equation modeling, and factor influence discrimination; Comparative Research on Landscape Preferences and Landscape Cognition of Urban Park Users (2020) on landscape cognition evaluation methods based on landscape preference questionnaire survey, element sample combination analysis, and park cognitive map generation, etc. When processing cognitive data, related methods often rely on users' self-reports, which are susceptible to memory bias and personal interpretation interference, thereby affecting the accuracy and reliability of cognitive data analysis. Meanwhile, these analytical methods are usually static and cannot fully grasp the spatial fluidity and temporal evolution of landscape environments and compositions thereof, thereby limiting the effectiveness of their cognitive decision-making applications.

Existing technologies include: a community public space update design method based on node information collection, daily parking analysis, social network generation, and spatial group comparison (application number: CN202010088995.7); a method for constructing a residential space network by service scope acquisition, residential area classification, and adjacency matrix relationship analysis (application number: CN202310898451.0); a public space optimization method based on building of material and behavioral network models and hierarchical analysis of "settlement-area-point" (application number: CN202310061699.1), etc. Although such technological methods have been developed, there are still some limitations: insufficient attention is paid to the cognitive feedback information of residents in residential outdoor environments; the hierarchical scale and analytical accuracy of residential outdoor environmental elements still need to be improved; the low integration of network decision-making functions from environmental cognition to environmental change characteristics makes it difficult for the existing methods to provide efficient guidance for the renewal and governance of residential outdoor environments.

SUMMARY

To solve the shortcomings mentioned in the background, the objective of the present invention is to provide a decision-making method and system for a residential outdoor environment based on landscape approach motivation.

In a first aspect, the objective of the present invention can be implemented through the following technical solution: A decision-making method for a residential outdoor environment based on landscape approach motivation includes the following steps:

obtaining engineering drawing data and material test data of the residential outdoor environment, and performing a landscape approach motivation test on the material test data of the residential outdoor environment to obtain environmental element data passing the test, where the engineering drawing data of the residential outdoor environment includes plane vector data and GPS positioning data of the residential outdoor environment, and the material test data includes standard image data of residential outdoor environmental elements;

delineating landscape nodes in the residential outdoor environment based on the engineering drawing data of the residential outdoor environment and the environmental element data passing the test, and determining evolution and similarity change states of the landscape nodes according to landscape approach motivation information of the environmental elements corresponding to the landscape nodes in the residential outdoor environment;

generating an initial landscape approach motivation decision-making matrix of the landscape nodes and their corresponding environmental elements based on the GPS positions and change states of the landscape nodes in the residential outdoor environment, encoding discrete variables of the GPS positions and change states of the landscape nodes in the residential outdoor environment, and building a distribution adjacency network of the landscape nodes based on the initial landscape approach motivation decision-making matrix of the landscape nodes; and performing environmental classification decision-making processing on the distribution adjacency network of the landscape nodes to obtain residential outdoor environmental decision-making results.

By combining the first aspect, in some implementations of the first aspect, the method further includes: the process of performing a landscape approach motivation test on the material test data of the residential outdoor environment includes:

idle state debugging, Stroop effect testing, and random playback of standard images of the residential outdoor environmental elements;

where a hypothesis test is performed on Stroop effect testing results to obtain fitted landscape approach motivation evaluation indicators, and the fitted landscape approach motivation evaluation indicators are normalized to ultimately obtain the environmental element data passing the test.

By combining the first aspect, in some implementations of the first aspect, the method further includes: a formula for normalizing the fitted landscape approach motivation evaluation indicators is as follows:

$$AW_i^t = \frac{r_i^t - \mu_i^t}{S_i^t}$$

where $AW_i^t$ represents a landscape approach motivation evaluation indicator value normalized from the $i^{th}$ class of residential outdoor environmental elements in the $t^{th}$ period; $r_i^t$ represents an original landscape approach motivation evaluation indicator value of the $i^{th}$ class of environmental elements in the $t^{th}$ period;

$\mu_i^t$ represents an average value of original landscape approach motivation evaluation indicators of the $i^{th}$ class of environmental elements in the $t^{th}$ period;

$S_i^t$ represents a standard deviation of the original landscape approach motivation evaluation indicators of the $i^{th}$ class of environmental elements in the $t^{th}$ period.

By combining the first aspect, in some implementations of the first aspect, the method further includes: the process of generating an initial landscape approach motivation decision-making matrix of the landscape nodes and their corresponding environmental elements includes:

constituting, based on structural landscape approach motivation information $R_{id}$ of the residential outdoor environmental elements in the landscape nodes, an initial decision-making matrix $Z^{wt}$ for the landscape approach motivation evaluation indicators of w landscape nodes $A_j=\{a_w, w=1, 2, 3, \ldots, 1\}$ in the $t^{th}$ period, and calculating probability matrices $P^{wt}$ of the initial decision-making matrix $Z^{wt}$ sequentially as follows:

$$P^{wt} = (p_{id}^{wt})_{m \times n} = \frac{Z^{wt}}{\sum_{j=1}^{w} Z^{wt}}, \text{ where } i = 1, 2, 3 \ldots, m, d = 1, 2, 3 \ldots, n$$

where $p_{id}^{wt}$ represents the uncertainty of landscape approach motivation information of the $w^{th}$ landscape node on the $n^{th}$ residential outdoor environmental element of the $m^{th}$ level in the $t^{th}$ period.

By combining the first aspect, in some implementations of the first aspect, the method further includes: calculating, based on the principle of information entropy, an entropy value $E_{id}$ of each residential outdoor environmental element and a utility value $O_{id}$ of its landscape approach motivation information, to obtain a weight $T_{id}$ of the environmental element, specifically:

$$O_{id} = 1 - E_{id} = 1 + \frac{1}{\ln(w)} \sum_{t=1}^{w} p_{id}^t \ln p_{id}^t, 0 \leq E_{id} \leq 1$$

$$T_{id} = \frac{O_{id}}{\sum_{d}^{w} O_{id}}, 0 \leq T_{id} \leq 1$$

Where $p_{id}^t$ represents an amount of landscape approach motivation information of the $n^{th}$ residential outdoor environmental element in the $t^{th}$ period; w represents a quantity of the landscape nodes in the residential outdoor environment;

decomposing the change state of the landscape approach motivation information of the environmental element corresponding to the landscape node in the residential outdoor environment into an evolution state and a similarity state, where the evolution state $EVO^{wt}$ represents a degree of dominance of the residential outdoor environmental element, reflects a vector space distance between the environmental element and its optimal value, and is calculated as follows:

$$B^{wt} = \sum_{i=1}^{m}\sum_{d=1}^{n} T_{id} b_{id}^{wt}, \text{ where } i = 1, 2, 3 \ldots, m, d = 1, 2, 3 \ldots, n$$

$$c_{id}^{wt} = \frac{b_{id}^{wt}}{b_{id}^{-wt}}$$

$$EVO^{wt} = \frac{\sqrt{\sum_{i=1}^{m}\sum_{d=1}^{n}\left(T_{id}c_{id}^{wt} - \max_{d}(T_{id}c_{id}^{wt})\right)}}{\max\left(\sqrt{\sum_{i=1}^{m}\sum_{d=1}^{n}\left(T_{id}c_{id}^{wt} - \max_{d}T_{id}c_{id}^{wt}\right)}\right)}$$

where $B^{wt}$ represents a comprehensive landscape approach motivation variable of the residential outdoor environmental elements;

$$b_{id}^{wt}$$

represents a landscape approach motivation evaluation indicator of the $d^{th}$ environmental element of the $i^{th}$ level corresponding to the $w^{th}$ landscape node in the residential outdoor environment in the $t^{th}$ period;

$$c_{id}^{wt}$$

represents an evolution coefficient of the landscape approach motivation evaluation indicators;

the similarity state $SIM^{wt}$ represents an associated development trend of the residential outdoor environmental elements, reflects a collaborative change trend of the environmental elements, and is calculated as follows:

$$V_{id}^{wt} = \frac{\min\limits_{m}\min\limits_{n}\left|c_{id}^{wt} - \max\limits_{d}(T_{id}c_{id}^{wt})\right| + \sigma\max\limits_{m}\max\limits_{n}\left|c_{id}^{wt} - \max\limits_{d}(T_{id}c_{id}^{wt})\right|}{\left|c_{id}^{wt} - \max\limits_{d}(T_{id}c_{id}^{wt})\right| + \sigma\max\limits_{m}\max\limits_{n}\left|c_{id}^{wt} - \max\limits_{d}(T_{id}c_{id}^{wt})\right|}$$

$$SIM^{wt} = \sum_{d=1}^{n} T_{id}|V_{id}^{wt}|, \text{ where } i = 1, 2, 3 \ldots,$$

$$m, d = 1, 2, 3 \ldots, n, w = 1, 2, 3, \ldots, l$$

where $$V_{id}^{wt}$$

represents a correlation coefficient between the $w^{th}$ landscape node in the residential outdoor environment and a most ideal node with respect to the $d^{th}$ environmental element of the $i^{th}$ level; $\sigma$ represents a resolution coefficient, indicating the importance of max calculation.

By combining the first aspect, in some implementations of the first aspect, the method further includes: the encoding of the GPS positions and change states of the landscape nodes in the residential outdoor environment is fused with the levels and class names of the residential outdoor environmental elements, landscape approach motivation change states, and GPS position attributes. The organizational structure of a geographical concept set of the residential outdoor environment is preset as a K-level structure tree. When $1 < k \leq K$, the maximum number of branches included in the $k^{th}$ level is defined as $$D_k^{max},$$

and the code of the classification level structure tree has $$K + \sum_{k=2}^{K} D_k^{max} \text{ bits}.$$

By combining the first aspect, in some implementations of the first aspect, the method further includes: the process of building a distribution adjacency network of the landscape nodes based on the initial landscape approach motivation decision-making matrix of the landscape nodes includes:

building a decision-making matrix S of the distribution adjacency network based on the evolution state and similarity state results of landscape approach motivation of the environmental elements, where the distribution adjacency network C=(w, e) consists of w landscape nodes and e edges, and is an undirected network of the landscape nodes.

By combining the first aspect, in some implementations of the first aspect, the method further includes: calculating, based on actual geographical distances between the landscape nodes in the residential outdoor environment, local adjacency indexes CWU-Call number $$GE_q^t \text{ and } GS_q^t$$

of the evolution state and similarity state of environmental element landscape approach motivation of the landscape node q in the $t^{th}$ period as follows:

$$GE_q^t = \frac{\sum_q T_{qh}^t(d) \cdot EVO_q^t - \overline{EVO^t} \cdot \sum_q T_{qh}^t(d)}{S_{\_EVO}\sqrt{\frac{w \cdot \sum_q T_{qh}^2(d) - \left(\sum_q T_{qh}^t(d)\right)^2}{w-1}}}$$

$$GS_q^t = \frac{\sum_q T_{qh}^t(d) \cdot SIM_q^t - \overline{SIM^t} \cdot \sum_q T_{qh}^t(d)}{S_{\_SIM}\sqrt{\frac{w \cdot \sum_q T_{qh}^2(d) - \left(\sum_q T_{qh}^t(d)\right)^2}{w-1}}}$$

where $$EVO_q^t \text{ and } SIM_q^t$$

represent evolution state and similarity state attribute values of the $q^{th}$ landscape node in the residential outdoor environment in the $t^{th}$ period, respectively;

$$T_{qh}^t(d)$$

represents a spatial weight between the landscape node q and the landscape node h in the $t^{th}$ period, determined by the actual geographical distance between the landscape nodes; $\overline{EVO^t}$ and $\overline{SIM^t}$ represent average values of the evolution state and similarity state attribute values of all the landscape nodes, respectively; $S_{\_EVO}$ and $S_{\_SIM}$ represent standard deviations of the evolution state and similarity state attribute values of all the landscape nodes, respectively; w represent the quantity of the landscape nodes;

loading the geographical concept set of the residential outdoor environment and the local adjacency indexes of the landscape nodes into the decision-making matrix S of the distribution adjacency network, and calculating a driving degree $S_{qh}^t$ of the edge connecting the landscape node q and the landscape node h in the $t^{th}$ period, where q≤w, h≤w:

$$SE_{qh}^t = \frac{w_{qh}^t EVO_q^t / \sum_{q \neq h} EVO_q^t + w_{qh}^t EVO_q^t / \sum_{q \neq h} EVO_q^t}{GE_q^t / \sum_{q=1}^{w} w_{qh}^t + GE_q^t / \sum_{h=1}^{w} w_{qh}^t}$$

$$SS_{qh}^t = \frac{w_{qh} SIM_q^t / \sum_{q \neq h} SIM_q^t + w_{qh} SIM_q^t / \sum_{q \neq h} SIM_q^t}{GS_q^t / \sum_{q=1}^{w} w_{qh}^t + GS_q^t / \sum_{h=1}^{w} w_{qh}^t}$$

$$S_{qh}^t = T_{\_SE} SE_{qh}^t + T_{\_SS} SS_{qh}^t$$

where $SE_{qh}^t$ and $SS_{qh}^t$ represent the driving degrees of the adjacency distribution network in the landscape approach motivation evolution state and similarity state between the landscape nodes q and h in the residential outdoor environment in the $t^{th}$ period, respectively;

$w_{qh}^t$ represents a non-standardized symmetric spatial interaction matrix between the landscape nodes q and h in the $t^{th}$ period; $T_{\_SE}$ and $T_{\_SS}$ represent equal distance weights of the driving degrees of the adjacency distribution network in the evolution state and similarity state, respectively.

By combining the first aspect, in some implementations of the first aspect, the method further includes: the process of performing environmental classification decision-making processing on the distribution adjacency network of the landscape nodes to obtain residential outdoor environmental decision-making results includes:

analyzing evolution state and similarity state data of the landscape approach motivation information of the residential outdoor environment, calculating intra-class sums of squares of deviations WSS and inter-class sums of squares of deviations BSS of the evolution state and similarity state, selecting the level with minimum WSS and maximum BSS as an optimal level, and dividing the evolution state and similarity state into f levels to obtain a level pattern of totally $f^2$ landscape approach motivation change states of the residential outdoor environment;

generating, based on the level pattern of change states of the residential outdoor environment, a decision-making network representing the adjacent spatial distribution of the landscape nodes in the residential outdoor environment, with the driving degrees $S_{qh}^t$ of the landscape approach motivation change states of the landscape nodes and their corresponding environmental elements as edge weights, the adjacency between landscape nodes as the basis for connecting landscape nodes, and the geographical relationship between engineering drawing elements and the driving degrees of the residential outdoor environment nodes;

analyzing spatial effect intensities of the landscape approach motivation distribution adjacency network of the landscape nodes in the residential outdoor environment, to obtain residential outdoor environment landscape nodes to be improved as follows:

$$SEI^t = \sum_{h \neq q} \frac{AS_{qh}^t}{NOD_q^t}$$

where $SEI^t$ represents the spatial effect intensities of the landscape nodes in the residential outdoor environment in the $t^{th}$ period;

$AS_{qh}^t$ represents a driving degree assignment for the landscape approach motivation change state of the landscape nodes q and h in the $t^{th}$ period; when $$S_{qh}^t > 0, AS_{qh}^t = 1; \text{when } S_{qh}^t < 0, AS_{qh}^t = 0; NOD_q^t$$

represents the number of edges connecting the $q^{th}$ landscape node with other nodes in the $t^{th}$ period;

normalizing the values of spatial effect intensities, calculating intra-class sums of squares of deviations WSS and inter-class sums of squares of deviations BSS of the normalized spatial effect intensities, selecting the level with minimum WSS and maximum BSS as an optimal level to obtain u levels of the spatial effect intensities, and assigning the u levels as $u_i$=j, for j=1, 2, . . . , u; meanwhile, assigning the level pattern of $f^2$ residential outdoor environment change states of the landscape nodes as $g_i$=i, for i=1, 2, . . . , $f^2$, to obtain a renewal and governance priority $Pr_{\_nod}$ of the landscape nodes as follows:

$$Pr_{\_nod} = u_i \cdot g_i.$$

In a second aspect, in order to achieve the above objective, the present invention discloses a decision-making system for a residential outdoor environment based on landscape approach motivation, including:

a data translation module, configured to obtain engineering drawing data and material test data of the residential outdoor environment, and perform a landscape approach motivation test on the material test data of the residential outdoor environment to obtain environmental element data passing the test, where the engineering drawing data of the residential outdoor environment includes plane vector data and GPS positioning data of the residential outdoor environment, and the material test data includes standard image data of residential outdoor environmental elements;

a state recognition module, configured to delineate landscape nodes in the residential outdoor environment based on the engineering drawing data of the residential outdoor environment and the environmental element data passing the test, and determine evolution and similarity change states of the landscape nodes based on landscape approach motivation information of the environmental elements corresponding to the landscape nodes in the residential outdoor environment;

a network building module, configured to generate an initial landscape approach motivation decision-making matrix of the landscape nodes and their corresponding environmental elements based on the GPS positions and change states of the landscape nodes in the residential outdoor environment, encode discrete variables of the GPS positions and change states of the landscape nodes in the residential outdoor environment, and build a distribution adjacency network of the landscape nodes based on the initial landscape approach motivation decision-making matrix of the landscape nodes; and an environmental decision-making module, configured to perform environmental classification decision-making processing on the distribution adjacency network of the landscape nodes to obtain residential outdoor environmental decision-making results.

Beneficial effects of the present invention are as follows:

The present invention:

(1) In response to the problems of subjectivity and cumbersome processing of cognitive data measurement methods for residential outdoor environments, the present invention combines brain cognitive test analysis technology and records electroencephalogram (EEG) signals of instantaneous stimulus of residential environmental elements in real time. By setting cognitive response determines rules for EEG "approach-avoidance", required environmental element landscape approach motivation cognitive feature information is extracted from complex and varied EEG signals, to achieve objective collection and rational analysis of environmental cognitive data, thereby improving the accuracy of cognitive feature extraction of the residential outdoor environment.

(2) In response to the differences, fluidity, and insufficient evolutionary analysis of residential outdoor environmental elements, the present invention, based on obtaining the results of environmental element landscape approach motivation indicators, comprehensively considers spatio-temporal range data of elements, establishes an initial landscape approach motivation decision-making matrix of landscape nodes in the residential outdoor environment and their corresponding environmental elements, and determines evolution and similarity change states of the landscape nodes, thereby achieving analysis on the spatio-temporal change states of multi-dimensional environmental elements, and ensuring the efficiency and accuracy of matrix operation of residential outdoor environmental elements.

(3) In response to the problems of low integration, low spatial resolution, and lack of application docking for environmental renewal and governance in residential landscape approach motivation network decision-making, the present invention maps the spatio-temporal change states of approach motivation of the landscape nodes to a geographical space, combines the decision-making matrix of the distribution adjacency network to generate a residential outdoor environmental decision-making network, determines the level pattern and spatial effect intensities of the change states of the landscape nodes, and provides renewal and governance priorities for the residential outdoor environment landscape nodes, thereby improving the capabilities of accurate decision-making and integrated analysis of the residential outdoor environment.

BRIEF DESCRIPTION OF THE DRAWINGS

In order to describe the technical solutions in the embodiments of the present invention or in the prior art more clearly, the following briefly introduces the accompanying drawings required in the description of the embodiments or the prior art. Apparently, those of ordinary skill in the art can derive other drawings from the accompanying drawings without any creative effort.

DETAILED DESCRIPTION OF THE EMBODIMENTS

The technical solutions in the embodiments of the present invention will be clearly and completely described below in conjunction with the accompanying drawings therein. Apparently, the described embodiments are only some of the embodiments of the present invention, not all of them. All other embodiments obtained by those of ordinary skill in the art based on the embodiments of the present invention without any creative efforts fall within the scope of protection of the present invention.

First Embodiment

Figure 1:
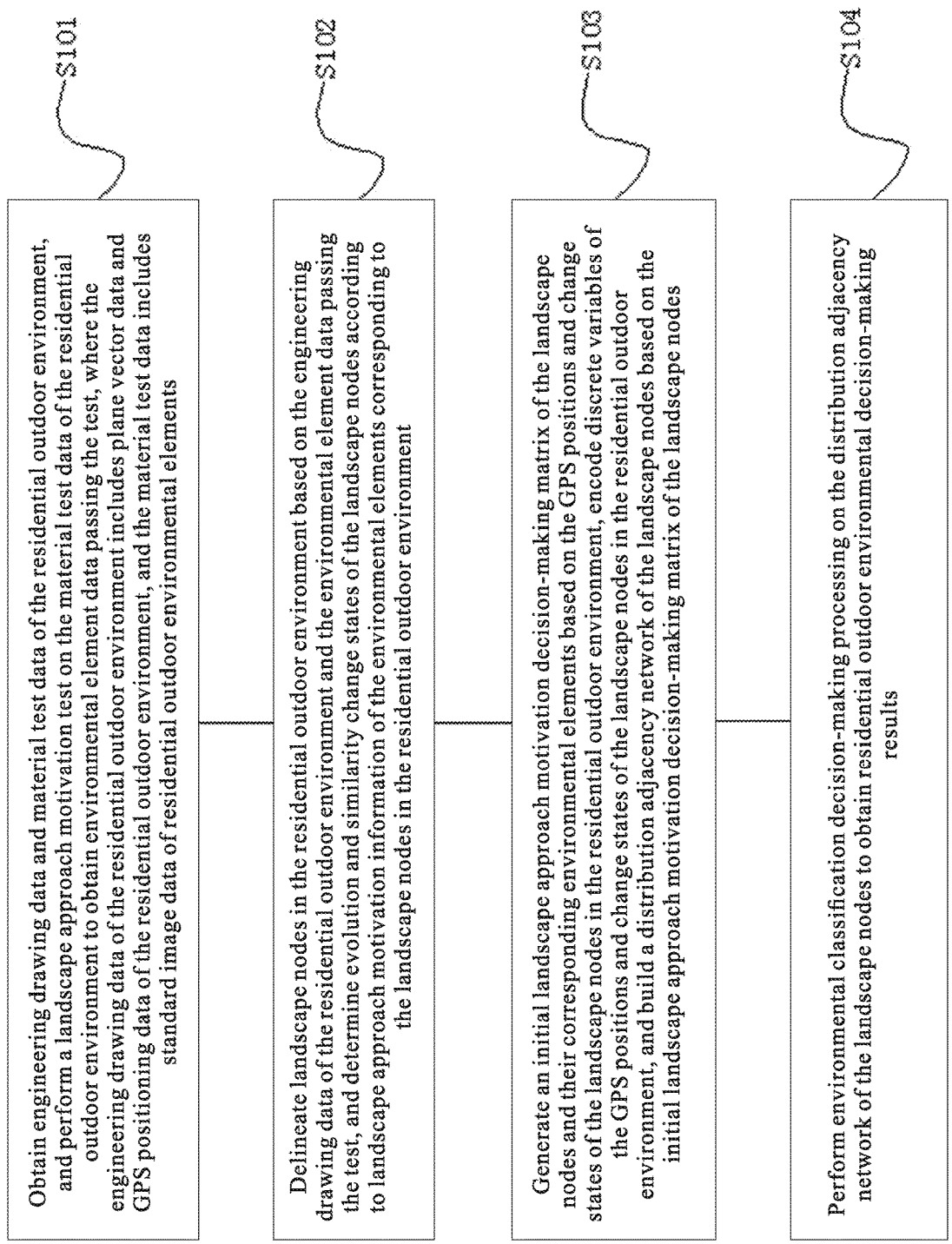
FIG. 1 is a schematic flowchart of a method of the present invention.
Figure 2A:
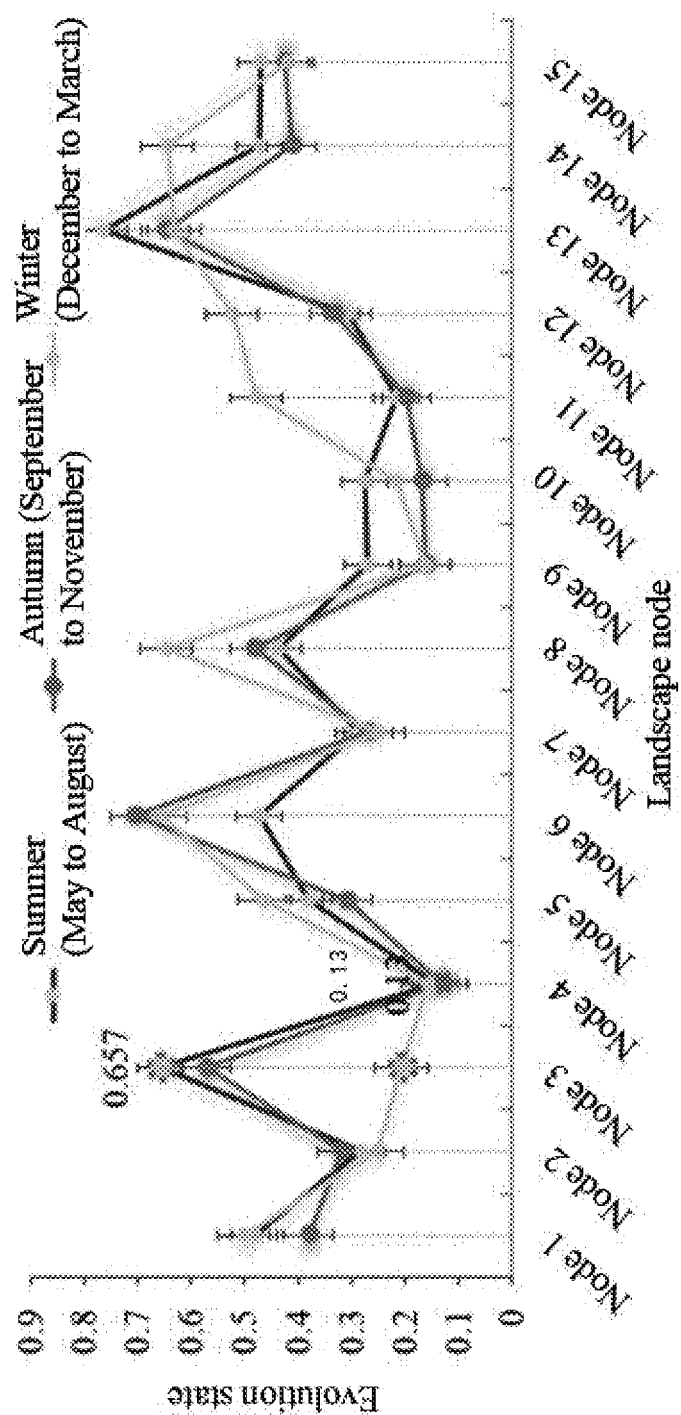
FIGS. 2A-2D are development trend diagrams of a landscape approach motivation evolution state of a residential outdoor environment according to an embodiment of the present invention.
Figure 2B:
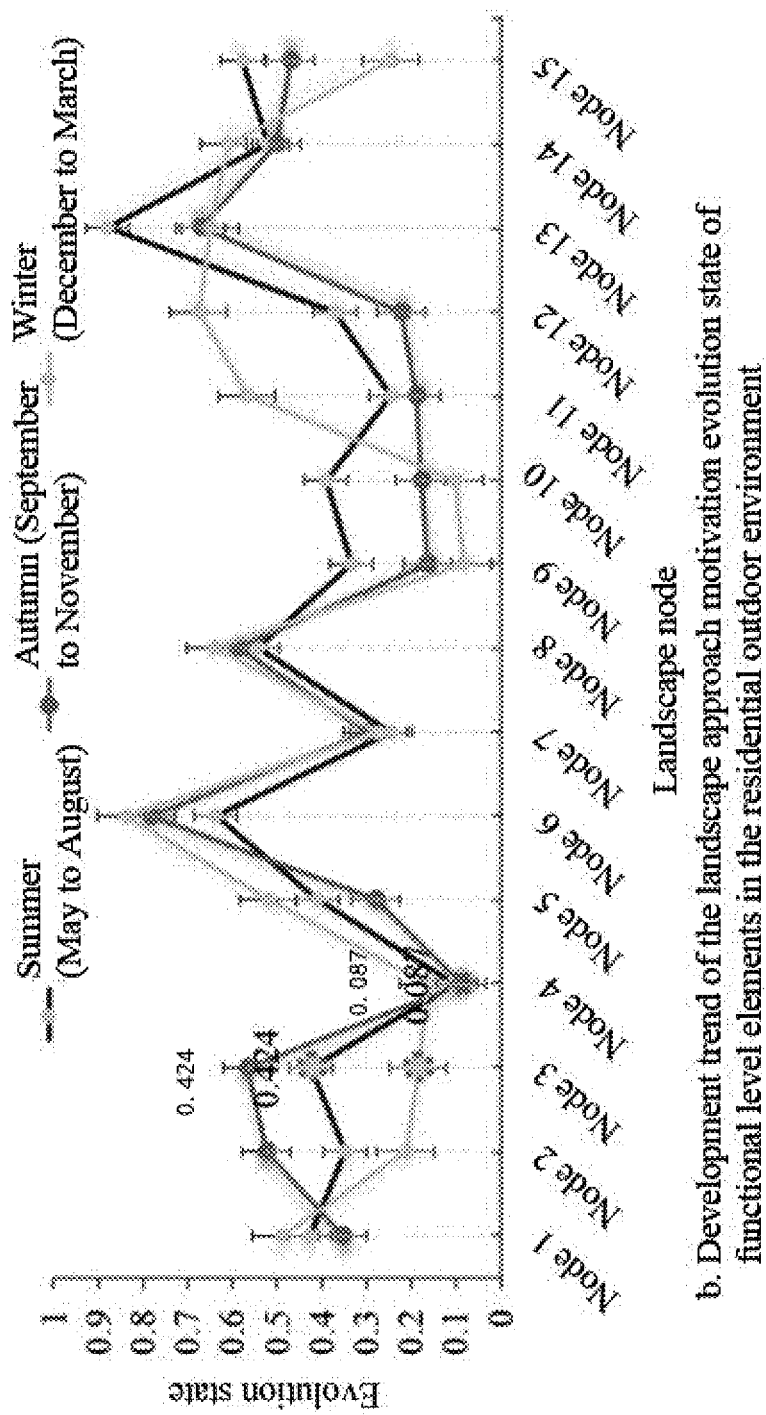
Figure 2C:
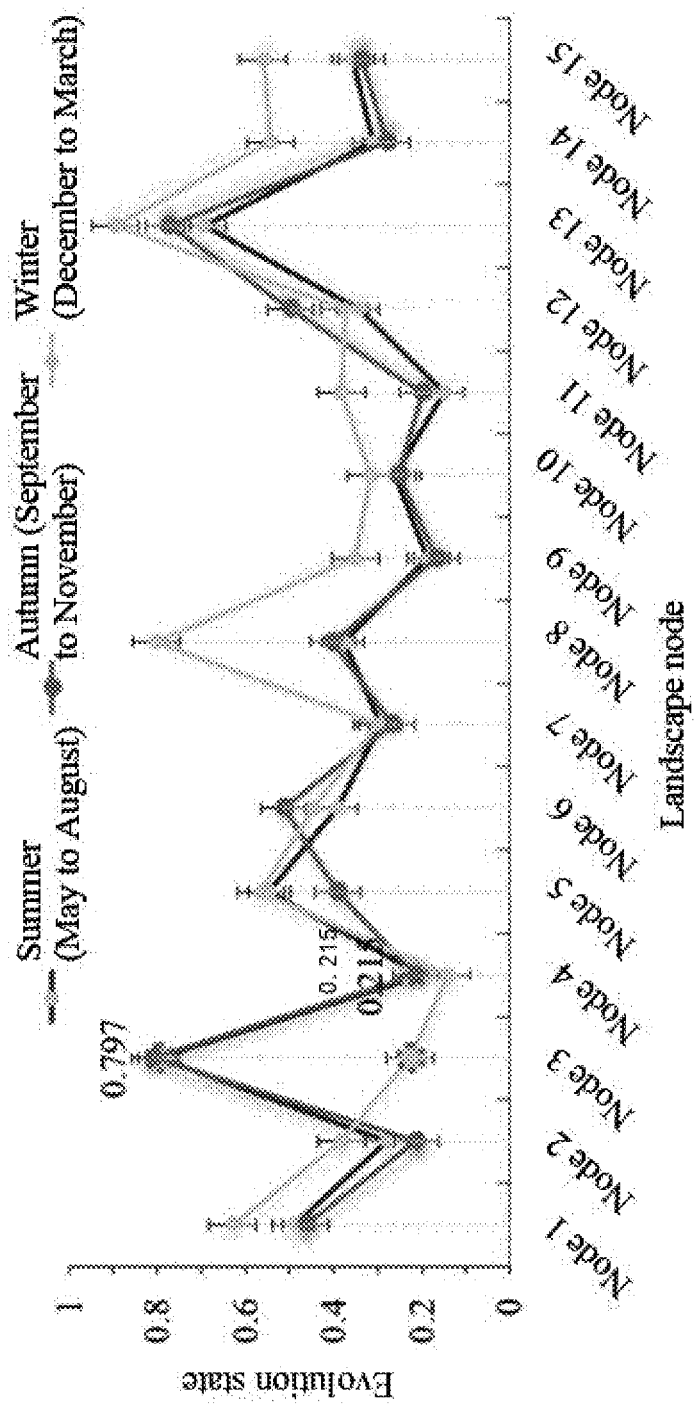
Figure 2D:
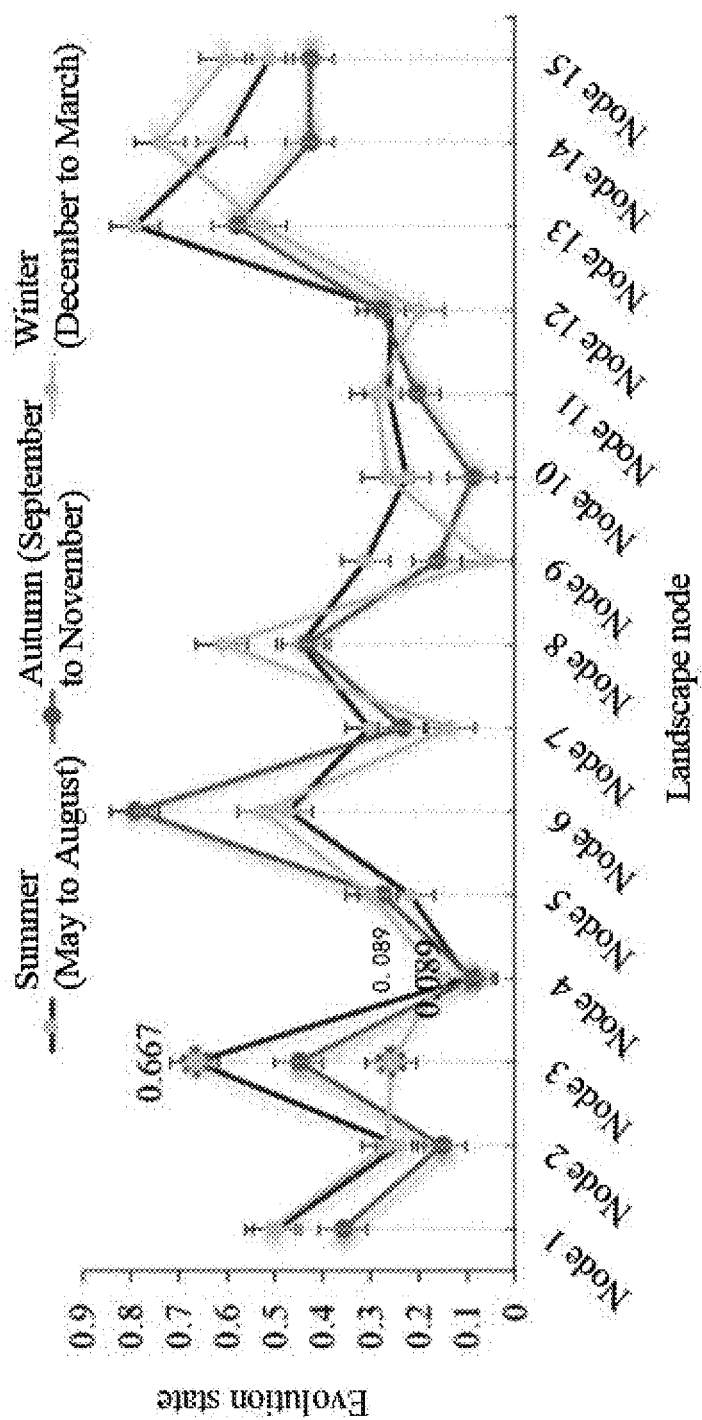
Figure 3A:
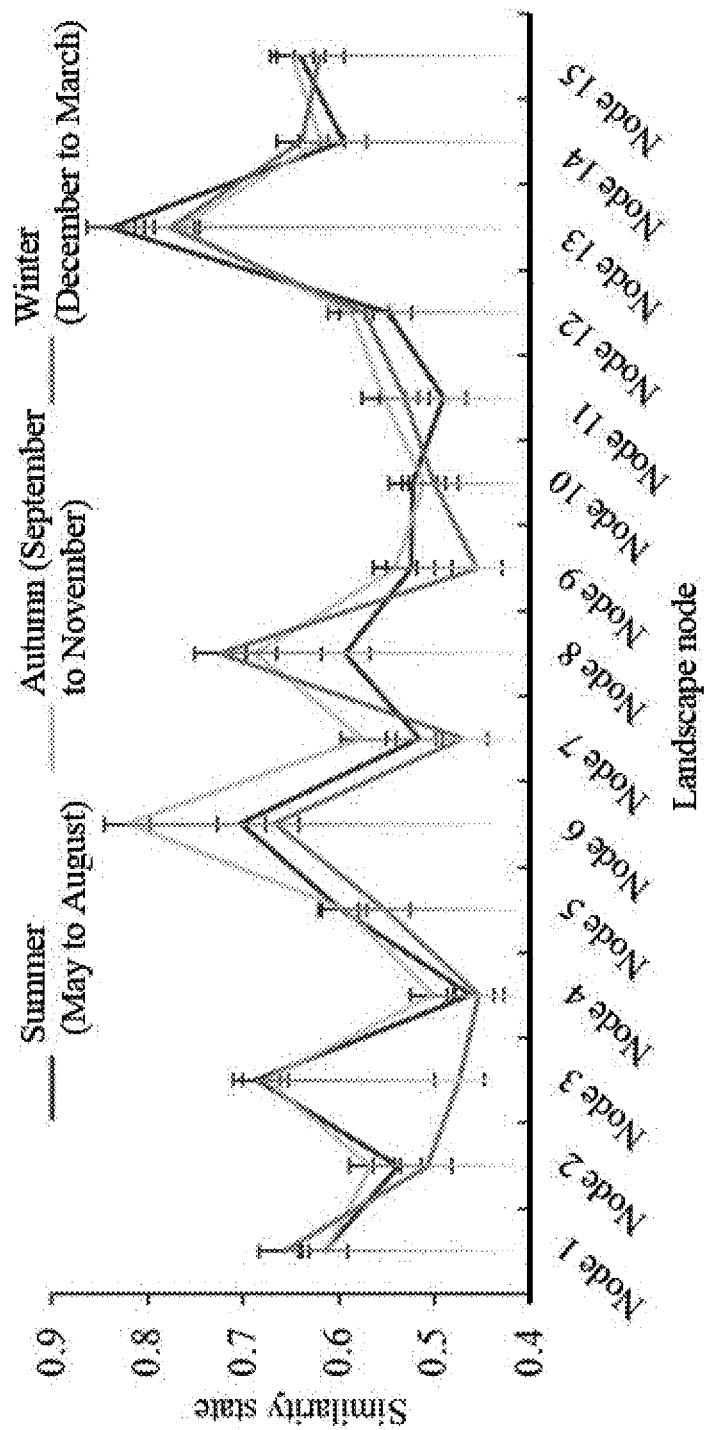
FIGS. 3A-3D are development trend diagrams of a landscape approach motivation similarity state of the residential outdoor environment according to an embodiment of the present invention.
Figure 3B:
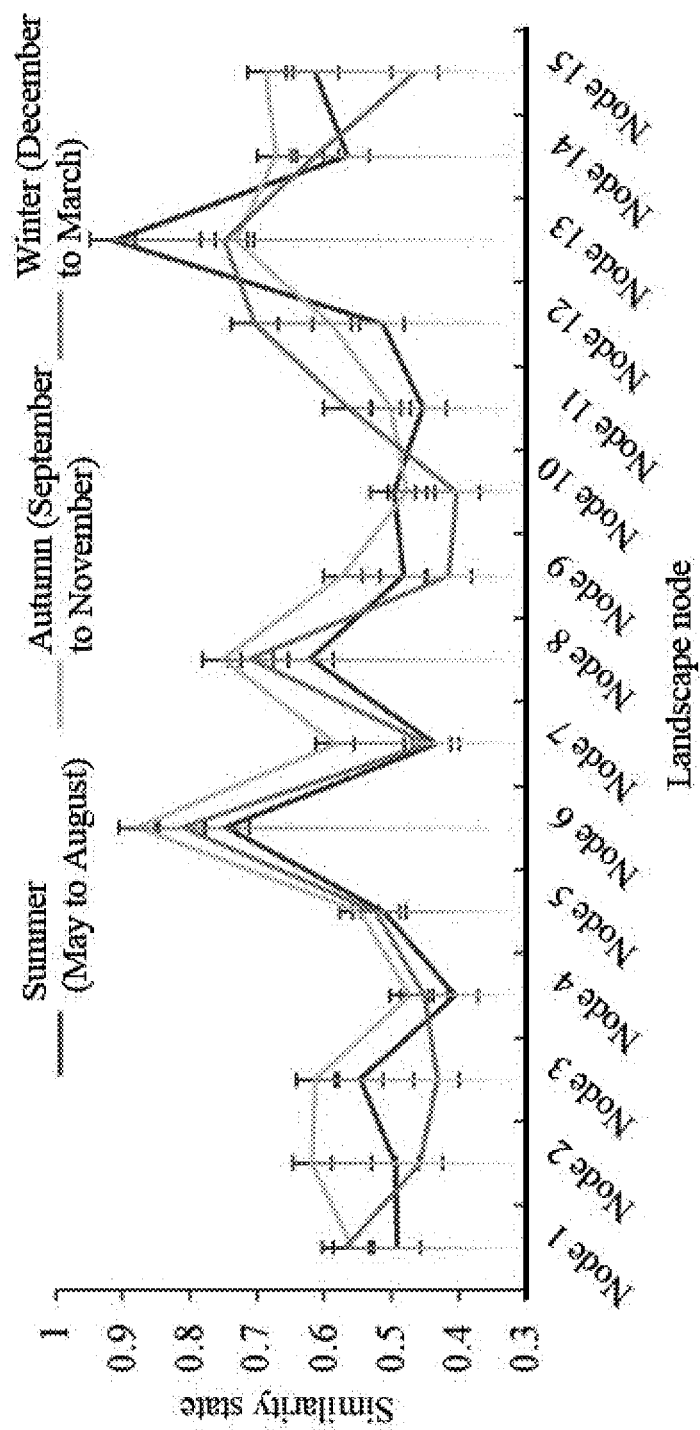
Figure 3C:
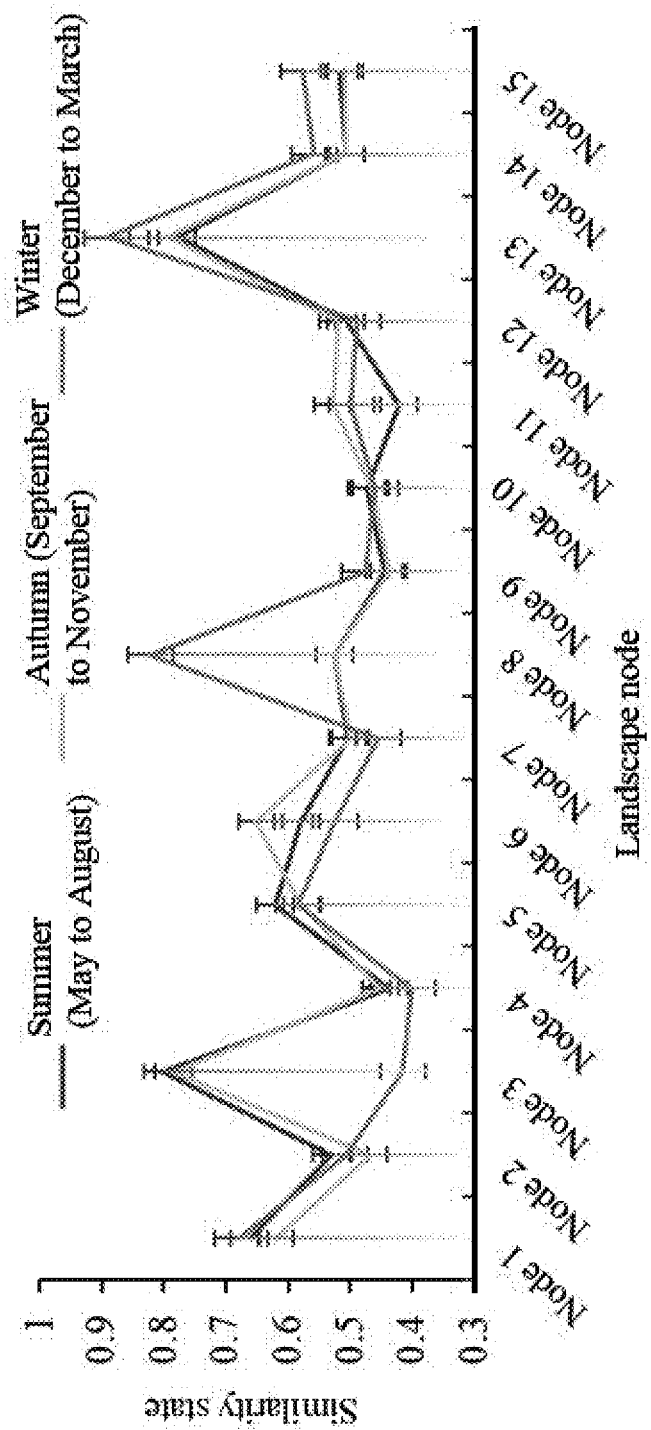
Figure 3D:
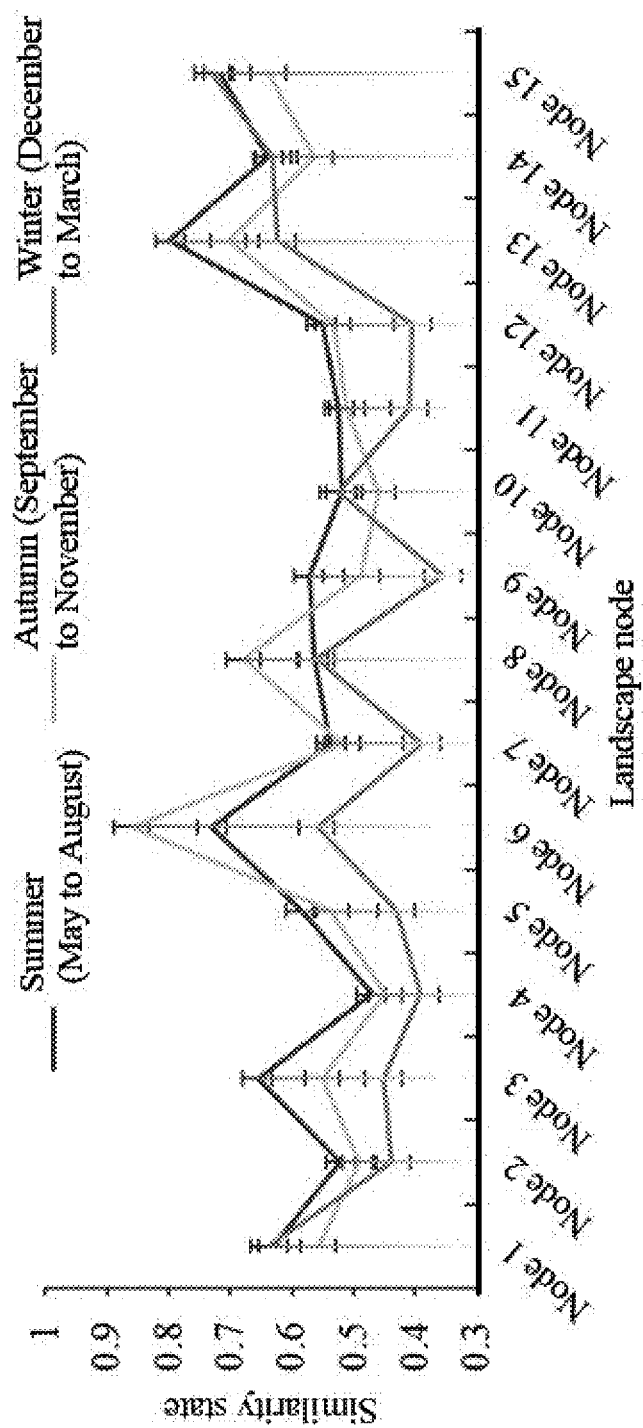

As shown in FIG. 1, a decision-making method for a residential outdoor environment based on landscape approach motivation includes the following steps:

S101: Obtain engineering drawing data and material test data of the residential outdoor environment, and perform a landscape approach motivation test on the material test data of the residential outdoor environment to obtain environmental element data passing the test, where the engineering drawing data of the residential outdoor environment includes plane vector data and GPS positioning data of the residential outdoor environment, and the material test data includes standard image data of residential outdoor environmental elements;

The process of performing a landscape approach motivation test on the material test data of the residential outdoor environment includes:

idle state debugging, Stroop effect testing, and random playback of standard images of the residential outdoor environmental elements;

A hypothesis test is performed on Stroop effect testing results to obtain fitted landscape approach motivation evaluation indicators, and the fitted landscape approach motivation evaluation indicators are normalized to ultimately obtain the environmental element data passing the test;

Specifically, the present invention will be further elaborated through examples:

Frontal lobe EEG signals of the standard images of the residential outdoor environmental elements are obtained, the EEG signals are accurately cut according to environmental element classes and collection periods, a data cleaning process of band-pass filtering, noise artifact removal, ICA analysis, and spectral analysis is used, and a significance test and an internal consistency reliability test are performed to calculate power spectral densities of frontal lobe EEG $\alpha$, $\theta$, and $\gamma$ rhythm bands of environmental elements passing the tests.

According to the principle of asymmetry in the frontal lobe of the brain, from a ratio of the power spectral densities of the EEG $\alpha$, $\theta$, and $\gamma$ rhythm bands, landscape approach motivation disturbance indicators ($x_1$; $x_2$; $x_3$) that can represent landscape "approach-avoidance" response are generated, calculated as follows:

$$x_1 = \frac{1}{n} \sum_n \frac{PSD_{left}(\alpha) - PSD_{right}(\alpha)}{PSD_{left}(\alpha) + PSD_{right}(\alpha)}$$

$$x_2 = \frac{1}{n} PSD(\theta)$$

$$x_3 = \frac{1}{n} \sum_n \frac{\log(PSD_{left}(\gamma)) - \log(PSD_{right}(\gamma))}{\log(PSD_{left}(\gamma)) + \log(PSD_{right}(\gamma))}$$

where n represents the number of EEG channels in the frontal lobe of the brain; PSD($\alpha$), PSD($\theta$), and PSD($\gamma$) represent the power spectral densities of the $\alpha$, $\theta$, and $\gamma$ rhythm bands, respectively; left and right represent the EEG channels on the left and right of the frontal lobe of the brain, respectively.

A hypothesis test (t-value and two-tailed p-value) and statistical verification of confidence intervals and effect sizes are performed on the Stroop effect testing results, to screen valid landscape approach motivation disturbance indicator values. On this basis, a change baseline of the landscape approach motivation is calibrated by stable EEG signals obtained in the idle state debugging phase, to obtain fitted landscape approach motivation evaluation indicators AW, specifically:

$$AW = a|x_{1\_post} - x_{1\_pre}| + b|x_{2\_post} - x_{2\_pre}| + c|x_{3\_post} - x_{3\_pre}| + \varphi$$

where $x_{1\_pre}$, $x_{2\_pre}$, $x_{3\_pre}$, $x_{1\_post}$, $x_{2\_post}$, and $x_{3\_post}$ represent average values of landscape approach disturbance indicators in the last 1 minute of the 30-second idle state debugging phase and the random playback phase of residential outdoor environmental element materials, respectively; a, b, and c represent coefficients of the landscape approach disturbance indicators in a linear combination, and $\varphi$ represents a random error; the larger the value of AW, the stronger the cognitive motivation to approach a landscape environment.

The value of the landscape approach motivation evaluation indicator is normalized to obtain residential outdoor environmental element structural information $$R_{id}^t = \{r_{id}^t, i = 1, 2, 3 \ldots, m, d = 1, 2, 3 \ldots, n\}$$

in the $t^{th}$ period, totally including m levels and n elements. A calculation formula for normalizing residential outdoor environmental elements is as follows:

$$AW_i^t = \frac{r_i^t - \mu_i^t}{S_i^t}$$

where $AW_i^t$ represents a landscape approach motivation evaluation indicator value normalized from the $i^{th}$ class of residential outdoor environmental elements in the $t^{th}$ period;

$r_i^t$ represents a original landscape approach motivation evaluation indicator value of the $i^{th}$ class of environmental elements in the $t^{th}$ period;

$\mu_i^t$ represents an average value or original landscape approach motivation evaluation indicators of the $i^{th}$ class of environmental elements in the $t^{th}$ period;

$S_i^t$ represents a standard deviation of the original landscape approach motivation evaluation indicators of the $i^{th}$ class of environmental elements in the $t^{th}$ period.

In this embodiment, the plane vector data of the residential outdoor environment is organized using AutoCAD software, where the plane vector data includes a residential red line range, geographic elevation data, road streamline data, green planting data, hard space data, building vector data, and GPS positioning data of residential outdoor environmental elements. Meanwhile, based on the current construction status of the residential outdoor environment and the demand for landscape renewal and governance, the system collects image data of environmental elements in summer, autumn, and winter. The actual pixel percentage of the environmental elements represented by the residential outdoor environment images is >70%, which ensures that the image standards of the environmental elements in different periods are consistent. An element level system including landscape function, form, and monomer is built, where functional level elements include distribution space, recreational garden, sports field, and featured platform; morphological level elements include enclosure, sequence, shape, and symbols; monomer level elements include vegetation, water body, structure, and facility.

Instantaneous stimulation EEG data of the residential outdoor environmental elements is processed using an Eegomylab portable EEG collection system and an MNE-Python EEG cleaning toolkit, where the P values of all the environmental elements passing the significance test are <0.05; the internal consistency Cronbach a of each class of elements is >0.65. Based on subjects and the number of trials of test materials, it is proved using G*Power software that the instantaneous stimulation results of the environmental elements satisfy the significance P-value ≤0.05, statistical power >0.5, confidence interval not including zero, and effect size Cohen's d≥0.2. The recognition of landscape approach motivation changes in the residential outdoor environmental elements can be continued.

S102: Delineate landscape nodes in the residential outdoor environment based on the engineering drawing data of the residential outdoor environment and the environmental element data passing the test, and determine evolution and similarity change states of the landscape nodes based on landscape approach motivation information of the environmental elements corresponding to the landscape nodes in the residential outdoor environment;

S103: Generate an initial landscape approach motivation decision-making matrix of the landscape nodes and their corresponding environmental elements based on the GPS positions and change states of the landscape nodes in the residential outdoor environment, encode discrete variables of the GPS positions and change states of the landscape nodes in the residential outdoor environment, and build a distribution adjacency network of the landscape nodes based on the initial landscape approach motivation decision-making matrix of the landscape nodes;

The process of generating an initial landscape approach motivation decision-making matrix of the landscape nodes and their corresponding environmental elements is as follows:

Based on structural landscape approach motivation information $R_{id}$ of the residential outdoor environmental elements in the landscape nodes, an initial decision-making matrix $Z^{wt}$ is constituted for the landscape approach motivation evaluation indicators of w landscape nodes $A_j = \{a_w, w=1, 2, 3, \ldots, l\}$ in the $t^{th}$ period, and probability matrices $P^{wt}$ of the initial decision-making matrix $Z^{wt}$ are calculated sequentially as follows:

$$P^{wt} = (p_{id}^{wt})_{m \times n} = \frac{Z^{wt}}{\sum_{j=1}^{w} Z^{wt}},$$

where $$i = 1, 2, 3 \cdots, m, d = 1, 2, 3 \cdots, n$$

where $$p_{id}^{wt}$$

represents the uncertainty or landscape approach motivation information of the $w^{th}$ landscape node on the $n^{th}$ residential outdoor environmental element of the $m^{th}$ level in the $t^{th}$ period.

Based on the principle of information entropy, an entropy value $E_{id}$ of each residential outdoor environmental element and a utility value $O_{id}$ of its landscape approach motivation information to obtain a weight $T_{id}$ of the environmental element, specifically:

$$O_{id} = 1 - E_{id} = 1 + \frac{1}{ln(w)} \sum_{t=1}^{w} p_{id}^t ln p_{id}^t, 0 \leq E_{id} \leq 1$$

$$T_{id} = \frac{O_{id}}{\sum_{d}^{w} O_{id}}, 0 \leq T_{id} \leq 1$$

where $$p_{id}^t$$

represents an amount of landscape approach motivation information of the $n^{th}$ residential outdoor environmental element in the $t^{th}$ period; w represents a quantity of the landscape nodes in the residential outdoor environment.

The change state of the landscape approach motivation information of the environmental element corresponding to the landscape node in the residential outdoor environment is decomposed into an evolution state and a similarity state, wherein the evolution state $EVO^{wt}$ represents a degree of dominance of the residential outdoor environmental element, reflects a vector space distance between the environmental element and its optimal value, and is calculated as follows:

$$B^{wt} = \sum_{i=1}^{m} \sum_{d=1}^{n} T_{id} \cdot b_{id}^{wt}, \text{ where } i = 1, 2, 3 \cdots, m, d = 1, 2, 3 \cdots, n$$

$$c_{id}^{wt} = \frac{b_{id}^{wt}}{b_{id}^{-wt}}$$

$$EVO^{wt} = \frac{\sqrt{\sum_{i=1}^{m} \sum_{d=1}^{n} \left( T_{id} c_{id}^{wt} - \max_d (T_{id} c_{id}^{wt}) \right)}}{\max\left( \sqrt{\sum_{i=1}^{m} \sum_{d=1}^{n} \left( T_{id} c_{id}^{wt} - \max_d T_{id} c_{id}^{wt} \right)} \right)}$$

where $B^{wt}$ represents a comprehensive landscape approach motivation variable of the residential outdoor environmental elements;

$$b_{id}^{wt}$$

represents a landscape approach motivation evaluation indicator of the $d^{th}$ environmental element of the $i^{th}$ level corresponding to the $w^{th}$ landscape node in the residential outdoor environment in the $t^{th}$ period, $$c_{id}^{wt}$$

represents an evolution coefficient of the landscape approach motivation evaluation indicators.

The similarity state $SIM^{wt}$ represents an associated development trend of the residential outdoor environmental elements, reflects a collaborative change trend of the environmental elements, and is calculated as follows:

$$V_{id}^{wt} = \frac{\min_{m} \min_{n} \left| c_{id}^{wt} - \max_{d}(T_{id}c_{id}^{wt}) \right| + \sigma \max_{m} \max_{n} \left| c_{id}^{wt} - \max_{d}(T_{id}c_{id}^{wt}) \right|}{\left| c_{id}^{wt} - \max_{d}(T_{id}c_{id}^{wt}) \right| + \sigma \max_{m} \max_{n} \left| c_{id}^{wt} - \max_{d}(T_{id}c_{id}^{wt}) \right|}$$

$$SIM^{wt} = \sum_{d=1}^{n} T_{id} |V_{id}^{wt}|, \text{ where } i = 1, 2, 3 \cdots,$$

$$m, d = 1, 2, 3 \cdots, n, w = 1, 2, 3, \cdots, l$$

where $$V_{id}^{wt}$$

represents a correlation coefficient between the $w^{th}$ landscape node in the residential outdoor environment and a most ideal node with respect to the $d^{th}$ environmental element of the $i^{th}$ level; $\sigma$ represents a resolution coefficient, indicating the importance of max calculation.

In this embodiment, kernel density analysis is performed on the GPS positioning data of the residential outdoor environmental elements using the GIS software, to recognize high-frequency and multi-type environmental element aggregation areas. Residents' use frequency and density in the residential outdoor environment are obtained using map punctuation. 15 representative landscape nodes are selected based on the superposition of the high-frequency and multi-type environmental element aggregation areas and the residents' use frequency and density, and with reference to the results of the aforementioned landscape approach motivation test of the environmental elements.

Weights of the residential outdoor environmental elements in 3 periods of summer, autumn, and winter are calculated by the initial landscape approach motivation decision-making matrix of the residential outdoor environmental elements (Table 1), where weight coefficients of the functional level in the 3 periods are 27.52%, 34.45%, and 41.42%, respectively; weight coefficients of the morphological level in the 3 periods are 36.31%, 30.37%, and 24.73%, respectively; weight coefficients of the individual level in the 3 periods are 36.18%, 35.19%, and 33.86%, respectively. The resolution coefficient $\sigma$ is set to 0.5, and the evolution state and similarity state of landscape approach motivation of the environmental elements are then identified to obtain a dynamic development trend of the landscape nodes in the residential outdoor environment (FIG. 2 and FIG. 3).

TABLE 1

Weights of residential outdoor environmental elements

| | | Weight coefficient (%) | | |
|---|---|---|---|---|
| Level | Element | Summer (May to August) | Autumn (September to November) | Winter (December to March) |
| Function | Distribution space | 8.20 | 3.24 | 8.55 |
| | Recreation garden | 6.74 | 12.08 | 11.70 |
| | Sports field | 6.03 | 5.73 | 15.25 |
| | Featured platform | 6.55 | 13.40 | 5.92 |
| Morphology | Enclosure | 7.75 | 4.18 | 5.97 |
| | Sequence | 12.12 | 11.22 | 7.47 |

TABLE 1-continued

Weights of residential outdoor environmental elements

| | | Weight coefficient (%) | | |
|---|---|---|---|---|
| Level | Element | Summer (May to August) | Autumn (September to November) | Winter (December to March) |
| | Shape | 8.63 | 8.49 | 5.84 |
| | Symbol | 7.81 | 6.48 | 5.45 |
| Individual | Vegetation | 12.44 | 9.30 | 5.01 |
| | Water body | 8.40 | 10.21 | 10.18 |
| | Building | 3.70 | 4.89 | 4.71 |
| | Facility | 11.64 | 10.79 | 13.96 |

The encoding of the GPS positions and change states of the landscape nodes in the residential outdoor environment is fused with the levels and class names of the residential outdoor environmental elements, landscape approach motivation change states, and GPS position attributes. The organizational structure of a geographical concept set of the residential outdoor environment is preset as a K-level structure tree. When $1 < k \leq K$, the maximum number of branches included in the $k^{th}$ level is defined as $$D_k^{max},$$

and the code of the classification level structure tree has $$K + \sum_{k=2}^{K} D_k^{max} \text{ bits.}$$

Element attributes are converted into visual variables by conditional determination according to attribute thresholds of the levels and classes of the residential outdoor environmental elements, and an objective mapping relationship of the real residential outdoor environment is output by drawing parameters. The visual variables are vector symbols of graphic elements, including lines, ellipses, polygons, etc. Each type of graphic elements has its drawing parameters In this embodiment, the structure tree of the geographical concept set of the residential outdoor environment is designed to four levels by One-Hot encoding, where the first level represents landscape nodes, the second and third levels represent element levels and classes, and the fourth level represents landscape approach motivation change states with time series, including an evolution state and a similarity state. On this basis, based on a visualization objective of a decision-making network for the residential outdoor environment, a comparison table of drawing parameters and visual variable conversion formats of element attributes of the residential outdoor environment (Table 2) is created.

TABLE 2

Comparison table of drawing parameters and visual variable conversion formats

| Element attribute | Drawing parameter | Visual variable | Scope | Applicable graphic element | Conversion method |
|---|---|---|---|---|---|
| Change state Driving degree | PenColor length | color length | type [−1, 1] | round line segment | step gradient class mapping |

TABLE 2-continued

Comparison table of drawing parameters and visual variable conversion formats

| Element attribute | Drawing parameter | Visual variable | Scope | Applicable graphic element | Conversion method |
|---|---|---|---|---|---|
| Name | font size | size | — | character | — |
| Quantity | FillColor | color | [0, 100] | ellipse | step gradient |
| Geographical coordinates | — | — | WGS84 | — | linear scale |

A decision-making matrix S of the distribution adjacency network is built based on the landscape nodes and the evolution state and similarity state results of landscape approach motivation of the landscape nodes and their corresponding environmental elements. The distribution adjacency network C=(w, e) consists of w landscape nodes and e edges, and is an undirected network of the landscape nodes.

Based on actual geographical distances between the landscape nodes in the residential outdoor environment, local adjacency indexes $$GE_q^t \text{ and } GS_q^t$$

of the evolution state and similarity state of environmental element landscape approach motivation of the landscape node q in the $t^{th}$ period are calculated, specifically:

$$GE_q^t = \frac{\sum_q T_{qh}^t(d) \cdot EVO_q^t - \overline{EVO^t} \cdot \sum_q T_{qh}^t(d)}{S_{\_EVO}\sqrt{\frac{w \cdot \sum_q T_{qh}^2(d) - \left(\sum_q T_{qh}^t(d)\right)^2}{w-1}}}$$

$$GS_q^t = \frac{\sum_q T_{qh}^t(d) \cdot SIM_q^t - \overline{SIM^t} \cdot \sum_q T_{qh}^t(d)}{S_{\_SIM}\sqrt{\frac{w \cdot \sum_q T_{qh}^2(d) - \left(\sum_q T_{qh}^t(d)\right)^2}{w-1}}}$$

where $$EVO_q^t \text{ and } SIM_q^t$$

represent evolution state and similarity state attribute values of the $q^{th}$ landscape node in the residential outdoor environment in the $t^{th}$ period, respectively;

$$T_{qh}^t(d)$$

represents a spatial weight between the landscape node q and the landscape node h in the $t^{th}$ period, determined by the actual geographical distance between the landscape nodes; $\overline{EVO^t}$ and $\overline{SIM^t}$ represent average values of the evolution state and similarity state attribute values of all the landscape nodes, respectively; $S_{\_EVO}$ and $S_{\_SIM}$ represent standard deviations of the evolution state and similarity state attribute values of all the landscape nodes, respectively; w represent the quantity of the landscape nodes;

When $$GE_q^t \text{ or } GS_q^t > 0,$$

the adjacent areas of the landscape nodes have a high aggregation distribution of evolution state or similarity state attribute values of environmental elements; when $$GE_q^t \text{ or } GS_q^t > 0,$$

the adjacent areas of the landscape nodes have low aggregation of evolution state or similarity state attribute values of environmental elements.

The geographical concept set of the residential outdoor environment and the local adjacency indexes of the landscape nodes are loaded into the decision-making matrix S of the distribution adjacency network, and the driving degree $$S_{qh}^t$$

of the edge connecting the landscape node q and the landscape node h in the $t^{th}$ period is calculated, where q≤w, h≤w:

$$SE_{qh}^t = \frac{w_{qh}^t EVO_q^t / \sum_{q \neq h} EVO_q^t + w_{qh}^t EVO_q^t / \sum_{q \neq h} EVO_q^t}{GE_q^t / \sum_{q=1}^{w} w_{qh}^t + GE_q^t / \sum_{h=1}^{w} w_{qh}^t}$$

$$SS_{qh}^t = \frac{w_{qh} SIM_q^t / \sum_{q \neq h} SIM_q^t + w_{qh} SIM_q^t / \sum_{q \neq h} SIM_q^t}{GS_q^t / \sum_{q=1}^{w} w_{qh}^t + GS_q^t / \sum_{h=1}^{w} w_{qh}^t}$$

$$S_{qh}^t = T_{\_SE} SE_{qh}^t + T_{\_SS} SS_{qh}^t$$

where $$SE_{qh}^t \text{ and } SS_{qh}^t$$

represent the driving degrees of the adjacency distribution network in the landscape approach motivation evolution state and similarity state between the landscape nodes q and h in the residential outdoor environment in the $t^{th}$ period, respectively;

$$w_{qh}^t$$

represents a non-standardized symmetric spatial interaction matrix between the landscape nodes q and h in the $t^{th}$ period; $T_{\_SE}$ and $T_{\_SS}$ represent equal distance weights of the driving degrees of the adjacency distribution network in the evolution state and similarity state, respectively.

When $$S_{qh}^t > 0,$$

the landscape approach motivation change state distribution network between the landscape nodes q and h has a relatively high driving degree, indicating that the landscape nodes q and h contribute significantly to the spatial pattern of landscape approach motivation in a common adjacency area of the residential outdoor environment, when $$S_{qh}^t < 0,$$

the landscape approach motivation change state distribution network between the landscape nodes q and h has a relatively low driving degree, indicating that the landscape nodes q and h contribute little to the spatial pattern of landscape approach motivation in the common adjacency area of the residential outdoor environment.

S104: Perform environmental classification decision-making processing on the distribution adjacency network of the landscape nodes to obtain residential outdoor environmental decision-making results.

Retrospective analysis is performed on evolution state and similarity state data of landscape approach motivation of the residential outdoor environment, intra-class sums of squares of deviations WSS and inter-class sums of squares of deviations BSS of the evolution state and similarity state are calculated, the level with minimum WSS and maximum BSS is selected as an optimal level, and the evolution state and similarity state are divided into f levels to obtain a level pattern of totally $f^2$ change states of the residential outdoor environment.

Based on the level pattern of change states of the residential outdoor environment, a decision-making network representing the adjacent spatial distribution of the landscape nodes in the residential outdoor environment is generated, with the driving degrees $$S_{qh}^t$$

of the landscape approach motivation change states of the landscape nodes and their corresponding environmental elements as edge weights, the adjacency between landscape nodes as the basis for connecting landscape nodes, and the geographical relationship between engineering drawing elements and the driving degrees of the residential outdoor environment nodes.

Spatial effect intensities of the landscape approach motivation distribution adjacency network of the landscape nodes in the residential outdoor environment are analyzed, to obtain residential outdoor environment landscape nodes to be improved as follows:

$$SEI^t = \sum_{h \neq q} \frac{AS_{qh}^t}{NOD_q^t}$$

where $SEI^t$ represents the spatial effect intensities of the landscape nodes in the residential outdoor environment in the $t^{th}$ period;

$$AS_{qh}^t$$

represents a driving degree assignment for the landscape approach motivation change state of the landscape nodes q and h in the $t^{th}$ period; when $$S_{qh}^t > 0, AS_{qh}^t = 1; \text{when } S_{qh}^t < 0, AS_{qh}^t = 0; NOD_q^t$$

represents the number of edges connecting the $q^{th}$ landscape node with other nodes in the $t^{th}$ period;

The values of spatial effect intensities are normalized, intra-class sums of squares of deviations WSS and inter-class sums of squares of deviations BSS of the normalized spatial effect intensities are calculated, the level with minimum WSS and maximum BSS is selected as an optimal level to obtain u levels of the spatial effect intensities, and the u levels are assigned as $u_j=j$, for j=1, 2, . . . , u. Meanwhile, the level pattern of $f^2$ residential outdoor environment change states of the landscape nodes is assigned as $g_i=i$, for i=1, 2, . . . , $f^2$, to obtain a renewal and governance priority $Pr_{\_nod}$ of the landscape nodes as follows:

$$Pr_{\_nod} = u_i \cdot g_i.$$

Figure 4A:
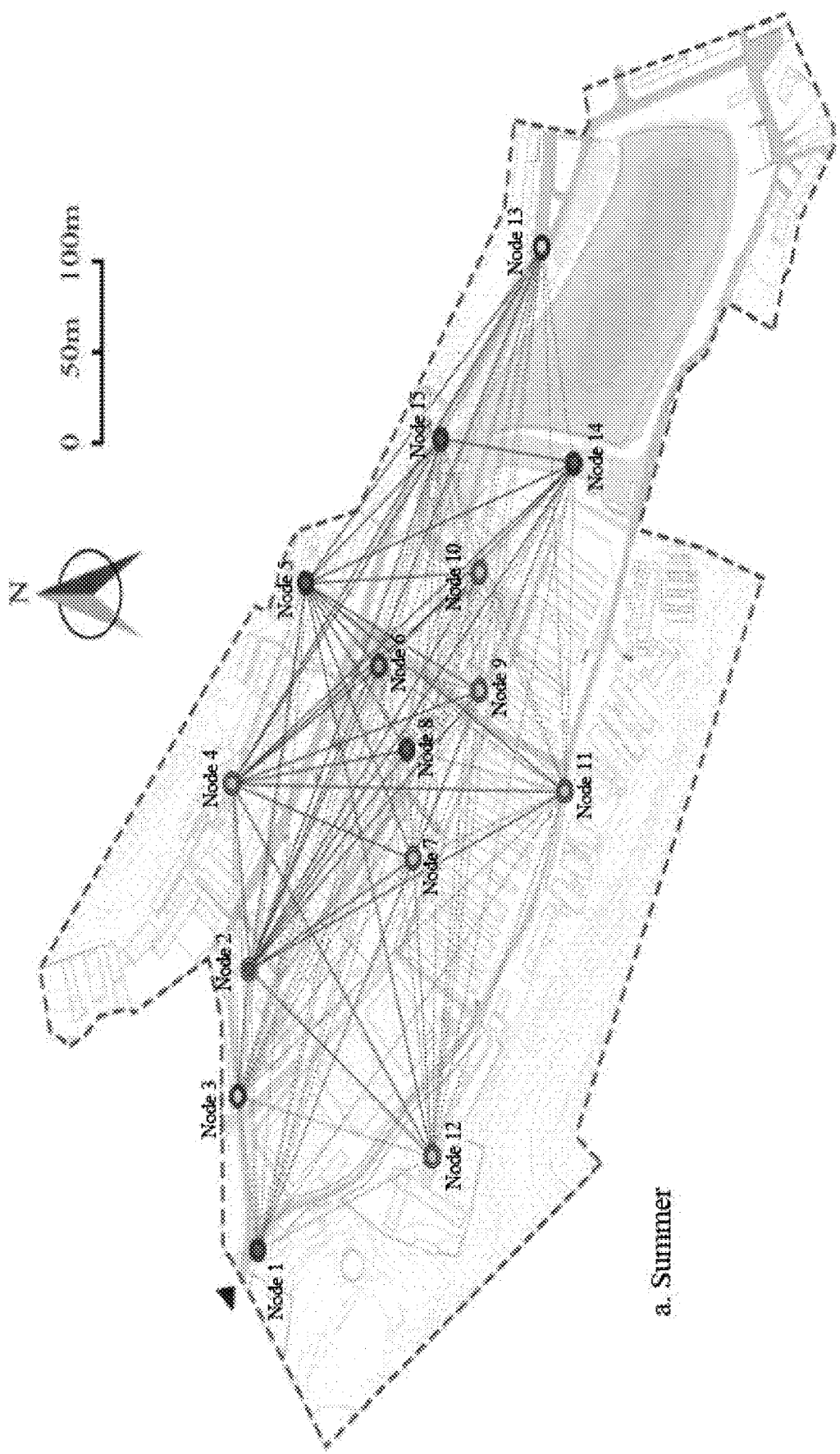
FIGS. 4A-4C are diagrams showing residential outdoor environmental decision-making networks in three periods of summer, autumn, and winter according to an embodiment of the present invention.
Figure 4B:
Figure 4C:
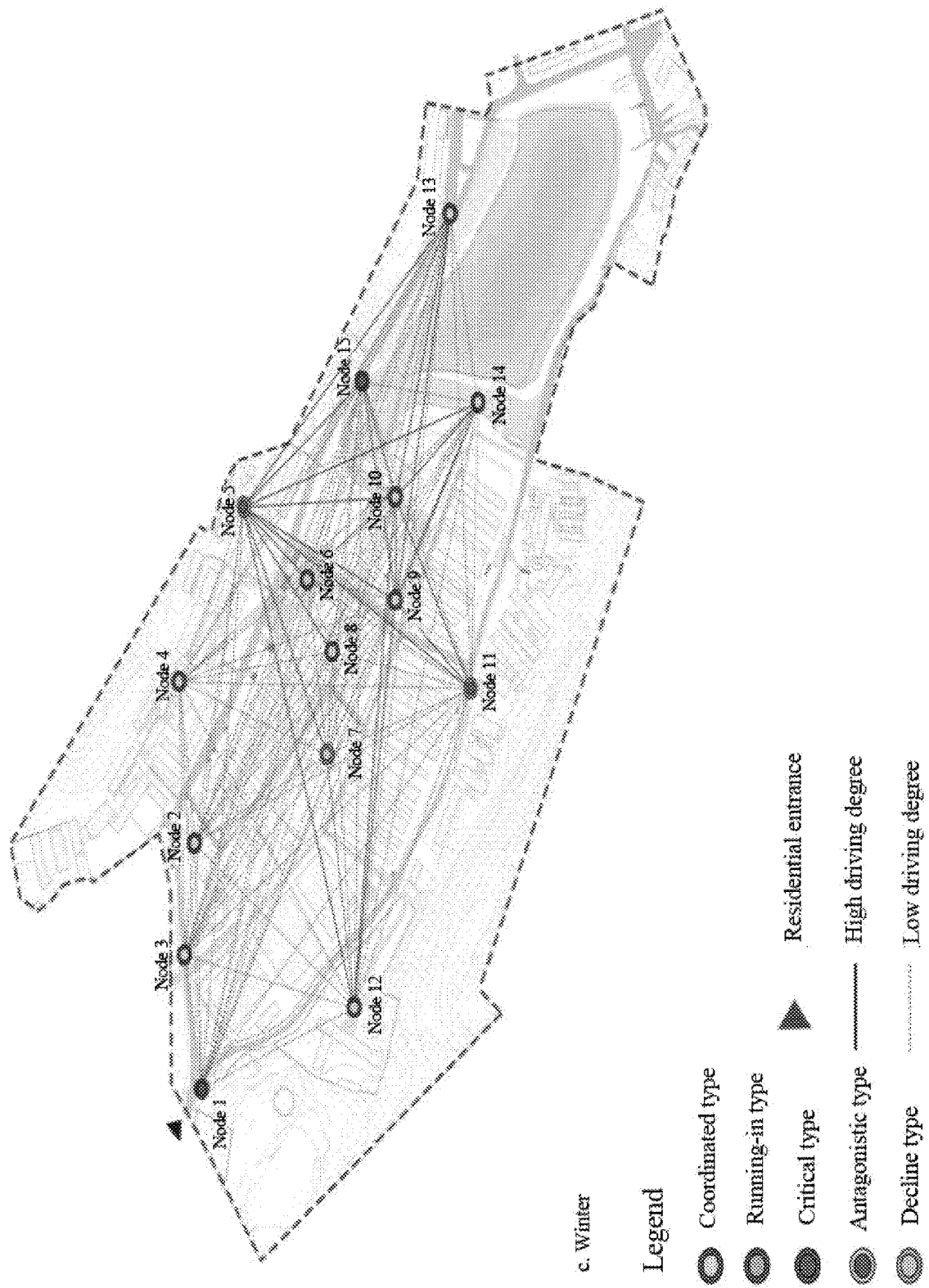

In this embodiment, the landscape approach motivation change states in the residential outdoor environment are divided into 3 levels, where the evolution state includes 3 levels: low [0, 0.332), medium [0.332, 0.523), and high [0.523, 1]; the similarity state includes 3 levels: low [0, 0.566), medium [0.566, 0.702), and high [0.702,1]; totally 9 residential outdoor environment change state level standards and corresponding 5 combination patterns are obtained (Table 3). By implementing the decision-making network, the distribution adjacency network of the landscape nodes in the residential outdoor environment is drawn (FIG. 4), where the solid lines and dashed lines of the edges represent the driving degrees of the distribution adjacency network of the landscape nodes greater than 1 and less than 1, respectively.

TABLE 3

Level pattern of residential outdoor environment change states

| Pattern | Standard | Assignment |
| --- | --- | --- |
| Coordinated type | High evolution, high similarity | 1 |
| Coordinated type | High evolution, medium similarity | 1 |
| Running-in type | High evolution, low similarity | 2 |
| Running-in type | Medium evolution, high similarity | 2 |
| Critical type | Medium evolution, medium similarity | 3 |
| Antagonistic type | Medium evolution, low similarity | 4 |
| Antagonistic type | Low evolution, high similarity | 4 |
| Decline type | Low evolution, medium similarity | 5 |
| Decline type | Low evolution, low similarity | 5 |

The spatial effect intensities of the distribution adjacency network of the landscape nodes in the residential outdoor environment are calculated, to obtain 3 level intervals of spatial effect intensities [0, 0.498), [0.498, 0.811), and [0.811,1]. Meanwhile, the $$NOD_q^t$$

data of the landscape nodes are graded using a natural breakpoint method, to obtain a clustering center of about 4.871. The landscape nodes with $$SEI^t \geq 0.8 \text{ and } NOD_q^t \geq 5$$

are thus set to occupy an important position in the decision-making network and have a significant impact on decision-making; the landscape nodes with $$SEI^t < 0.5 \text{ and } NOD_q^t \geq 5$$

need to be improved, and 4 combination patterns are thus produced and assigned with values (Table 4).

TABLE 4

Level pattern of spatial effect intensities of landscape nodes in the residential outdoor environment

| Pattern | Standard | Assignment |
|---|---|---|
| Maintaining type | $SEI^t \geq 0.8$ and $NOD_q^t \geq 5$ | 1 |
| Improvement type | $0.5 \leq SEI^t < 0.8$ and $NOD_q^t \geq 5$ | 2 |
| Improvement type | $NOD_q^t < 5$ | 2 |
| Renewal type | $SEI^t < 0.5$ and $NOD_q^t \geq 5$ | 3 |

Renewal and governance priority rankings of the landscape nodes in the residential outdoor environment in summer, autumn, and winter are calculated respectively, to obtain top three renewal and governance priority rankings of the landscape nodes in summer: node 4 ($Pr_{\_nod}$=15; decline type, renewal type), node 2 ($Pr_{\_nod}$=12; antagonistic type, renewal type), and nodes 7, 9, 10, 11, and 12 ($Pr_{\_nod}$=10; decline type, improvement type); top three renewal and governance priority rankings of the landscape nodes in autumn: nodes 2, 4, 5, 7, 9, and 10 ($Pr_{\_nod}$=15 decline type, renewal type), node 11 ($Pr_{\_nod}$=10; decline type, improvement type), and nodes 1, 8, 12, and 14 ($Pr_{\_nod}$=6; critical type, improvement type); and top three renewal and governance priority rankings of the landscape nodes in winter: node 5 ($Pr_{\_nod}$=12; antagonistic type, renewal type), node 7 ($Pr_{\_nod}$=10; decline type, improvement type), and node 11 ($Pr_{\_nod}$=antagonistic type; decline type, improvement type).

Figure 5:
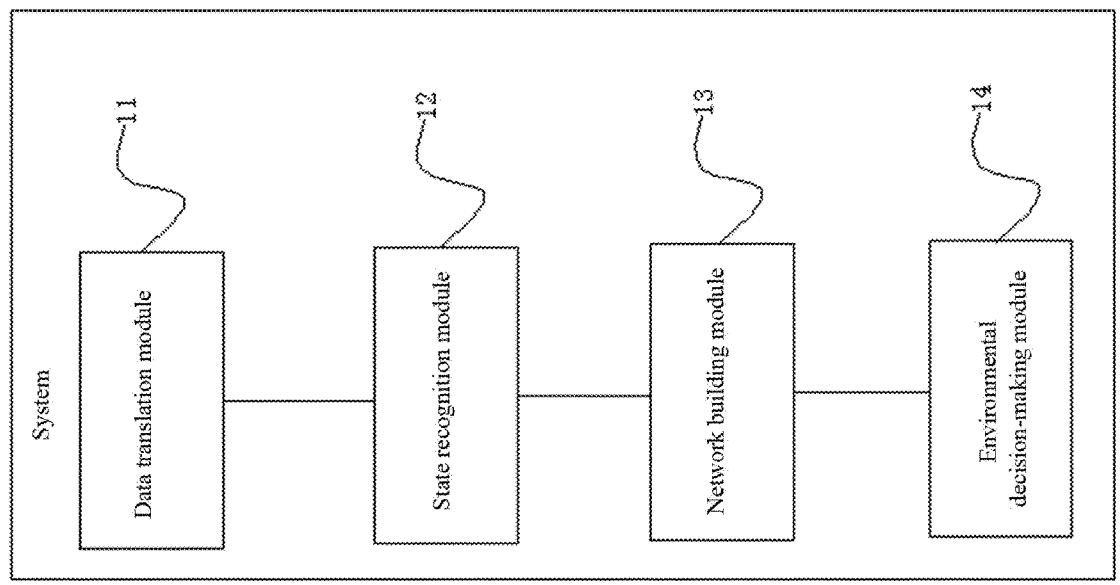
FIG. 5 is a schematic structural diagram of a system of the present invention.

Second embodiment: In a second aspect, as shown in FIG. 5, a decision-making system for a residential outdoor environment based on landscape approach motivation includes:

a data translation module 11, configured to obtain engineering drawing data and material test data of the residential outdoor environment, and perform a landscape approach motivation test on the material test data of the residential outdoor environment to obtain environmental element data passing the test, where the engineering drawing data of the residential outdoor environment includes plane vector data and GPS positioning data of the residential outdoor environment, and the material test data includes standard image data of residential outdoor environmental elements;

a state recognition module 12, configured to delineate landscape nodes in the residential outdoor environment based on the engineering drawing data of the residential outdoor environment and the environmental element data passing the test, and determine evolution and similarity change states of the landscape nodes based on landscape approach motivation information of the environmental elements corresponding to the landscape nodes in the residential outdoor environment;

a network building module 13, configured to generate an initial landscape approach motivation decision-making matrix of the landscape nodes and their corresponding environmental elements based on the GPS positions and change states of the landscape nodes in the residential outdoor environment, encode discrete variables of the GPS positions and change states of the landscape nodes in the residential outdoor environment, and build a distribution adjacency network of the landscape nodes based on the initial landscape approach motivation decision-making matrix of the landscape nodes; and an environmental decision-making module 14, configured to perform environmental classification decision-making processing on the distribution adjacency network of the landscape nodes to obtain residential outdoor environmental decision-making results.

Based on the same inventive concept, the present invention further provides a computer device, including: one or more processors, and a memory for storing one or more computer programs; the program includes program instructions, and the processor is configured to execute the program instructions stored in the memory. The processor may be a central processing unit (CPU), or other general-purpose processors, digital signal processors (DSPs), application specific integrated circuits (ASICs), field-programmable gate arrays (FPGAs) or other programmable logic devices, discrete gate or transistor logic devices, discrete hardware components, etc. The processor is a computing core and a control core of a terminal, and is configured to implement one or more instructions, specifically to load and execute one or more instructions in a computer storage medium to implement the above method.

It should be further explained that, based on the same inventive concept, the present invention further provides a computer storage medium storing a computer program that, when executed by a processor, performs the above method. The storage medium may be any one or any combination of more computer-readable media. The computer-readable media may be computer-readable signal media or computer-readable storage media. For example, the computer-readable storage medium may be, but is not limited to, an electrical, magnetic, optical, magnetic, infrared, or semiconductor system, apparatus, or device, or any combination of the above. More specific examples (non-exhaustive list) of the computer-readable storage medium include: an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical memory, a magnetic memory, or any suitable combination of the above. In the present invention, the computer-readable storage medium may be any tangible medium including or storing programs which can be used by an instruction execution system, apparatus or device or incorporated thereto.

In the description of this specification, the reference terms "one embodiment", "example", "specific example", etc. indicate that the specific feature, structure, material, or characteristic described in conjunction with the embodiment or example is included in at least one embodiment or example of the present disclosure. In the specification, the schematic descriptions of the above terms do not necessarily refer to the same embodiment or example. Moreover, the described specific features, structures, materials or characteristics can be combined in any one or more embodiments or examples in a suitable manner.

The basic principles, main features and advantages of the present invention are shown and described above. Those skilled in the art should understand that the present disclosure is not limited by the above embodiments, the above embodiments and the descriptions only illustrate the principles of the present disclosure, the present disclosure has various changes and improvements without departing from the spirit and scope of the present disclosure, and these changes and improvements all fall within the scope of the present disclosure.

What is claimed is:

1. A decision-making method for a residential outdoor environment based on landscape approach motivation, comprising:

measuring electroencephalogram (EEG) signals of instantaneous stimulus of residential outdoor environmental elements in real time to combine the EEG signals with brain cognitive test analysis technology and set cognitive response determination rules for EEG approach-avoidance responses;

obtaining engineering drawing data and material test data of the residential outdoor environment, said residential outdoor environment including the environmental elements, and performing a landscape approach motivation test on the material test data of the residential outdoor environment to obtain environmental element data passing the landscape approach motivation test, wherein the performing the landscape approach motivation test includes processing the EEG signals to determine which environmental elements of the environmental test data cause an approach cognitive response and pass the landscape approach motivation test, wherein the engineering drawing data of the residential outdoor environment comprises plane vector data and global positioning system (GPS) positioning data of the residential outdoor environment, and the material test data comprises standard image data of the residential outdoor environmental elements;

delineating landscape nodes in the residential outdoor environment based on the engineering drawing data of the residential outdoor environment and the environmental element data passing the landscape approach motivation test, and determining evolution and similarity change states of the landscape nodes based on landscape approach motivation information of environmental elements corresponding to the landscape nodes in the residential outdoor environment;

generating an initial landscape approach motivation decision-making matrix of the landscape nodes and the environmental elements corresponding to the landscape nodes based on GPS positions and change states of the landscape nodes in the residential outdoor environment, encoding discrete variables of the GPS positions and the change states of the landscape nodes in the residential outdoor environment, and building a distribution adjacency network of the landscape nodes based on the initial landscape approach motivation decision-making matrix of the landscape nodes; and performing environmental classification decision-making processing on the distribution adjacency network of the landscape nodes to obtain residential outdoor environmental decision-making results.

2. The decision-making method for the residential outdoor environment based on landscape approach motivation according to claim 1, wherein a process of performing the landscape approach motivation test on the material test data of the residential outdoor environment comprises:

idle state debugging, Stroop effect testing, and random playback of standard images of the residential outdoor environmental elements;

wherein a hypothesis test is performed on Stroop effect testing results to obtain fitted landscape approach motivation evaluation indicators, and the fitted landscape approach motivation evaluation indicators are normalized to ultimately obtain the environmental element data passing the landscape approach motivation test.

3. The decision-making method for the residential outdoor environment based on landscape approach motivation according to claim 2, wherein a formula for normalizing the fitted landscape approach motivation evaluation indicators is as follows:

$$AW_i^t = \frac{r_i^t - \mu_i^t}{S_i^t}$$

wherein $AW_i^t$ represents a landscape approach motivation evaluation indicator value normalized from an $i^{th}$ class of residential outdoor environmental elements in a $t^{th}$ period;

$r_i^t$ represents an original landscape approach motivation evaluation indicator value of an $i^{th}$ class of environmental elements in the $t^{th}$ period;

$\mu_i^t$ represents an average value of original landscape approach motivation evaluation indicators of the $i^{th}$ class of environmental elements in the $t^{th}$ period;

$S_i^t$ represents a standard deviation of the original landscape approach motivation evaluation indicators of the $i^{th}$ class of environmental elements in the $t^{th}$ period.

4. The decision-making method for the residential outdoor environment based on landscape approach motivation according to claim 1, wherein a process of generating the initial landscape approach motivation decision-making matrix of the landscape nodes and the environmental elements corresponding to the landscape nodes comprises:

constituting, based on structural landscape approach motivation information $R_{id}$ of the residential outdoor environmental elements in the landscape nodes, an initial decision-making matrix $Z^{wt}$ for landscape approach motivation evaluation indicators of w landscape nodes $A_f=\{a_w, w=1,2,3,\ldots,\}$ in a $t^{th}$ period, and calculating probability matrices $p^{wt}$ of the initial decision-making matrix $Z^{wt}$ sequentially as follows:

$$P^{wt} = (p_{id}^{wt})_{m \times n} = \frac{Z^{wt}}{\sum_{j=1}^{w} Z^{wt}},$$

wherein $$p_{id}^{wt}$$

represent an uncertainty of landscape approach motivation information of a $w^{th}$ landscape node on an $n^{th}$ residential outdoor environmental element of an $m^{th}$ level in the $t^{th}$ period.

5. The decision-making method for the residential outdoor environment based on landscape approach motivation according to claim 4, wherein based on a principle of information entropy, an entropy value $E_{id}$ of each residential outdoor environmental element and a utility value $O_{id}$ of landscape approach motivation information are calculated to obtain a weight $T_{id}$ of an environmental element, specifically:

$$O_{id} = 1 - E_{id} = 1 + \frac{1}{\ln(w)} \sum_{t=1}^{w} p_{id}^t \ln p_{id}^t, \ 0 \le E_{id} \le 1$$

$$T_{id} = \frac{O_{id}}{\sum_{d}^{w} O_{id}}, \ 0 \le T_{id} \le 1$$

wherein $$p_{id}^t$$

represents an amount of landscape approach motivation information of the $n^{th}$ residential outdoor environmental element in the $t^{th}$ period; w represents a quantity of the landscape nodes in the residential outdoor environment;

a change state of the landscape approach motivation information of the environmental elements corresponding to the landscape nodes in the residential outdoor environment is decomposed into an evolution state and a similarity state, wherein the evolution state $EVO^{wt}$ represents a degree of dominance of the residential outdoor environmental elements, reflects a vector space distance between the environmental element and an optimal value of the environmental element, and is calculated as follows:

$$B^{wt} = \sum_{i=1}^{m}\sum_{d=1}^{n} T_{id} b_{id}^{wt}, \text{ wherein } i = 1, 2, 3 \ldots, m, d = 1, 2, 3 \ldots, n$$

-continued $$c_{id}^{wt} = \frac{b_{id}^{wt}}{b_{id}^{-wt}}$$

$$EVO^{wt} = \frac{\sqrt{\sum_{i=1}^{m}\sum_{d=1}^{n}\left(T_{id}c_{id}^{wt} - \max_{d}(T_{id}c_{id}^{wt})\right)}}{\max\left(\sqrt{\sum_{i=1}^{m}\sum_{d=1}^{n}\left(T_{id}c_{id}^{wt} - \max_{d} T_{id}c_{id}^{wt}\right)}\right)}$$

wherein $B^{wt}$ represents a comprehensive landscape approach motivation variable of the residential outdoor environmental elements;

$$b_{id}^{wt}$$

represents a landscape approach motivation evaluation indicator of a $d^{th}$ environmental element of an $i^{th}$ level corresponding to the $w^{th}$ landscape node in the residential outdoor environment in the $t^{th}$ period;

$$c_{id}^{wt}$$

represents an evolution coefficient of the landscape approach motivation evaluation indicators;

the similarity state $SIM^{wt}$ represents an associated development of the residential outdoor environmental elements, reflects a collaborative change trend of the residential outdoor environmental elements, and is calculated as follows:

$$V_{id}^{wt} = \frac{\min_{m}\min_{n}\left|c_{id}^{wt} - \max_{d}(T_{id}c_{id}^{wt})\right| + \sigma \max_{m}\max_{n}\left|c_{id}^{wt} - \max_{d}(T_{id}c_{id}^{wt})\right|}{\left|c_{id}^{wt} - \max_{d}(T_{id}c_{id}^{wt})\right| + \sigma \max_{m}\max_{n}\left|c_{id}^{wt} - \max_{d}(T_{id}c_{id}^{wt})\right|}$$

$$SIM^{wt} = \sum_{d=1}^{n} T_{id}|V_{id}^{wt}|,$$

wherein $i = 1, 2, 3 \ldots, m, d = 1, 2, 3, \ldots, n, w = 1, 2, 3, \ldots, l$ wherein $$V_{id}^{wt}$$

represents a correlation coefficient between the $w^{th}$ landscape node in the residential outdoor environment and a most ideal node with respect to the $d^{th}$ environmental element of the $i^{th}$ level; $\sigma$ represents a resolution coefficient, indicating an importance of max calculation.

6. The decision-making method for the residential outdoor environment based on landscape approach motivation according to claim 1, wherein the encoding of the GPS positions and the change states of the landscape nodes in the residential outdoor environment is fused with levels and class names of the residential outdoor environmental elements, landscape approach motivation change states, and GPS position attributes; an organizational structure of a geographical concept set of the residential outdoor environment is preset as a K-level structure tree; when 1<k≤K, a maximum number of branches comprised in a $k^{th}$ level is defined as $$D_k^{max},$$

and a code or a classification level structure tree has $$K + \sum_{k=2}^{K} D_k^{max} \text{ bits.}$$

7. The decision-making method for the residential outdoor environment based on landscape approach motivation according to claim 1, wherein a process of building the distribution adjacency network of the landscape nodes based on the initial landscape approach motivation decision-making matrix of the landscape nodes and the environmental elements corresponding to the landscape nodes comprises:
building a decision-making matrix S of the distribution adjacency network based on evolution state and similarity state results of landscape approach motivation of the landscape nodes and the environmental elements corresponding to the landscape nodes, wherein the distribution adjacency network C=(w, e) consists of w landscape nodes and e edges, and is an undirected network of the landscape nodes.

8. The decision-making method for the residential outdoor environment based on landscape approach motivation according to claim 7, wherein based on actual geographical distances between the landscape nodes in the residential outdoor environment, local adjacency indexes $$GE_q^t \text{ and } GS_q^t$$

of an evolution state and a similarity state of environmental element landscape approach motivation of a landscape node q in a $t^{th}$ period are calculated as follows:

$$GE_q^t = \frac{\sum_q T_{qh}^t(d) \cdot EVO_q^t - \overline{EVO}^t \cdot \sum_q T_{qh}^t(d)}{S_{\_EVO} \sqrt{\frac{w \cdot \sum_q T_{qh}^{2}(d) - \left(\sum_q T_{qh}^t(d)\right)^2}{w-1}}}$$

$$GS_q^t = \frac{\sum_q T_{qh}^t(d) \cdot SIM_q^t - \overline{SIM}^t \cdot \sum_q T_{qh}^t(d)}{S_{\_SIM} \sqrt{\frac{w \cdot \sum_q T_{qh}^{2}(d) - \left(\sum_q T_{qh}^t(d)\right)^2}{w-1}}}$$

wherein $$EVO_q^t \text{ and } SIM_q^t$$

represents evolution state and similarity state attribute values of a $q^{th}$ landscape node in the residential outdoor environment in the $t^{th}$ period, respectively;

$$T_{qh}^t(d)$$

represents a spatial weight between the landscape node q and a landscape node h in the $t^{th}$ period, determined by the actual geographical distance between the landscape nodes; $\overline{EVO}^t$ and $\overline{SIM}^t$ represent average values of the evolution state and similarity state attribute values of all the landscape nodes, respectively; $S_{\_EVO}$ and $S_{\_SIM}$ represent standard deviations of the evolution state and similarity state attribute values of all the landscape nodes, respectively; w represent a quantity of the landscape nodes;
a geographical concept set of the residential outdoor environment and the local adjacency indexes of the landscape nodes are loaded into the decision-making matrix S of the distribution adjacency network, and a driving degree $$S_{qh}^t$$

of an edge connecting the landscape node q and the landscape node h in the $t^{th}$ period is calculated, wherein q≤w, h≤w:

$$SE_{qh}^t = \frac{w_{qh}^t EVO_q^t / \sum_{q \neq h} EVO_q^t + w_{qh}^t EVO_q^t / \sum_{q \neq h} EVO_q^t}{GE_q^t / \sum_{q=1}^{w} w_{qh}^t + GE_q^t / \sum_{h=1}^{w} w_{qh}^t}$$

$$SS_{qh}^t = \frac{w_{qh}^t SIM_q^t / \sum_{q \neq h} SIM_q^t + w_{qh}^t SIM_q^t / \sum_{q \neq h} SIM_q^t}{GS_q^t / \sum_{q=1}^{w} w_{qh}^t + GS_q^t / \sum_{h=1}^{w} w_{qh}^t}$$

$$S_{qh}^t = T_{\_SE} SE_{qh}^t + T_{\_SS} SS_{qh}^t$$

wherein $$SE_{qh}^t \text{ and } SS_{qh}^t$$

represent driving degrees of the distribution adjacency network in a landscape approach motivation evolution state and similarity state between the landscape nodes q and h in the residential outdoor environment in the $t^{th}$ period, respectively;

$$w_{qh}^t$$

represents a non-standardized symmetric spatial interaction matrix between the landscape nodes q and h in the $t^{th}$ period; $T_{\_SE}$ and $T_{\_SS}$ represent equal distance weights of the driving degrees of the distribution adjacency network in the landscape approach motivation evolution state and similarity state, respectively.

9. The decision-making method for the residential outdoor environment based on landscape approach motivation according to claim 1, wherein a process of performing the environmental classification decision-making processing on the distribution adjacency network of the landscape nodes to obtain the residential outdoor environmental decision-making results comprises:
analyzing evolution state and similarity state data of the landscape approach motivation information of the residential outdoor environment, calculating intra-class sums of squares of deviations WSS and inter-class sums of squares of deviations BSS of an evolution state and similarity state, selecting a level with minimum WSS and maximum BSS as an optimal level, and dividing the evolution state and similarity state into f levels to obtain a level pattern of totally $f^2$ landscape approach motivation change states of the residential outdoor environment;

generating, based on the level pattern of the $f^2$ landscape approach motivation change states of the residential outdoor environment, a decision-making network representing an adjacent spatial distribution of the landscape nodes in the residential outdoor environment, with driving degrees $$S_{qh}^t$$

of landscape approach motivation change states of the landscape nodes and the environmental elements corresponding to the landscape nodes as edge weights, an adjacency between the landscape nodes as a basis for connecting the landscape nodes, and a geographical relationship between engineering drawing elements and driving degrees of residential outdoor environment nodes;

analyzing spatial effect intensities of a landscape approach motivation distribution adjacency network of the landscape nodes in the residential outdoor environment, to obtain residential outdoor environment landscape nodes to be improved as follows:

$$SEI^t = \sum_{h \neq q} \frac{AS_{qh}^t}{NOD_q^t}$$

wherein $SEI^t$ represents spatial effect intensities of the landscape nodes in the residential outdoor environment in a $t^{th}$ period;

$$AS_{qh}^t$$

represents a driving degree assignment for a landscape approach motivation change state of landscape nodes q and h in the $t^{th}$ period; when $$S_{qh}^t > 0, AS_{qh}^t = 1; \text{when } S_{qh}^t < 0, AS_{qh}^t = 0; NOD_q^t$$

represents a number of edges connecting a $q^{th}$ landscape node with other nodes in the $t^{th}$ period;

normalizing values of the spatial effect intensities, calculating intra-class sums of squares of deviations WSS and inter-class sums of squares of deviations BSS of normalized spatial effect intensities, selecting the level with minimum WSS and maximum BSS as the optimal level to obtain u levels of the spatial effect intensities, and assigning the u levels as $u_i = j$, for $j=1,2,\ldots,u$; meanwhile, assigning a level pattern of $f^2$ residential outdoor environment change states of the landscape nodes as $g_i = i$, for $i=1,2,\ldots,f^2$, to obtain a renewal and governance priority $Pr_{\_nod}$ of the landscape nodes as follows:

$$Pr_{\_nod} = u_i \cdot g_i.$$

* * * * *